US012701225B2

(12) United States Patent
Zhang et al.

(10) Patent No.: US 12,701,225 B2
(45) Date of Patent: Aug. 4, 2026

(54) ADAPTIVE LOOP FILTER CLASSIFICATION AND SELECTION FOR VIDEO CODING

(71) Applicant: Intel Corporation, Santa Clara, CA (US)

(72) Inventors: Ximin Zhang, San Jose, CA (US); Yi-Jen Chiu, San Jose, CA (US); Keith Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/955,223

(22) Filed: Sep. 28, 2022

(65) Prior Publication Data

US 2023/0034367 A1     Feb. 2, 2023

(51) Int. Cl.
*H04N 19/117*     (2014.01)
*H04N 19/172*     (2014.01)
*H04N 19/186*     (2014.01)
*H04N 19/82*     (2014.01)

(52) U.S. Cl.
CPC ......... *H04N 19/117* (2014.11); *H04N 19/172* (2014.11); *H04N 19/186* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 2013/0114694 A1* | 5/2013 | Chen | H04N 19/70 |
| | | | 375/240.03 |
| 2022/0256201 A1* | 8/2022 | Chen | H04N 19/186 |
| 2022/0264106 A1* | 8/2022 | Zhang | H04N 9/77 |
| 2022/0377324 A1* | 11/2022 | Yang | H04N 19/82 |

OTHER PUBLICATIONS

Hamidouche et al., "Versatile Video Coding Standard: A Review from Coding Tools to Consumers Deployment," IEEE Consumer Electronics Magazine, 2021, 10 pages.
(Continued)

*Primary Examiner* — Stuart D Bennett
(74) *Attorney, Agent, or Firm* — Hanley, Flight & Zimmerman, LLC

(57)     ABSTRACT
Example methods, apparatus, systems and articles of manufacture to implement adaptive loop filter classification and selection for video coding are disclosed. Examples disclosed herein determine whether a collection of available adaptive loop filter sets associated with luma components of the input picture is empty. When the collection of available adaptive loop filter sets is not empty, disclosed examples also enable adaptive loop filtering for the luma components of the input picture, and select at least one of the collection of available adaptive loop filter sets to include in a selection of adaptive loop filter sets for the input picture, with the selection based on an order in which ones of the available adaptive loop filter sets in the collection were derived. Some disclosed examples additionally or alternatively perform block classification to determine accumulated class statistics for derivation of an adaptive loop filter set associated with the input picture.

25 Claims, 16 Drawing Sheets

(56)                    References Cited

OTHER PUBLICATIONS

Roman Guskov, "Adaptive Loop Filter," vicuesoft-techblog, dated Feb. 25, 2021, accessed at https://medium.com/vicuesoft-techblog/adaptive-loop-filter-a49fe3d3f733 on Aug. 9, 2022, 6 pages.

Moto, "HEVC—What are CTU, CU, CTB, CB, PB and TB?" CODE: Sequoia, dated Oct. 28, 2012, accessed at https://codesequoia.wordpress.com/2012/10/28/hevc-ctu-cu-ctb-cb-ph-and-tb/ on Sep. 7, 2022, 7 pages.

Bross et al., "Overview of the Versatile Video Coding (VVC) Standard and Its Applications," IEEE Transactions on Circuits and Systems for Video Technology, vol. 31, No. 10, Oct. 2021, 29 pages.

Saha et al., "Complexity Analysis of a Versatile Video Coding Decoder over Embedded Systems and General Purpose Processors," Sensors 2021, 21, 3320, https://doi.org/10.3390/s21103320, 2021, 20 pages.

* cited by examiner

740

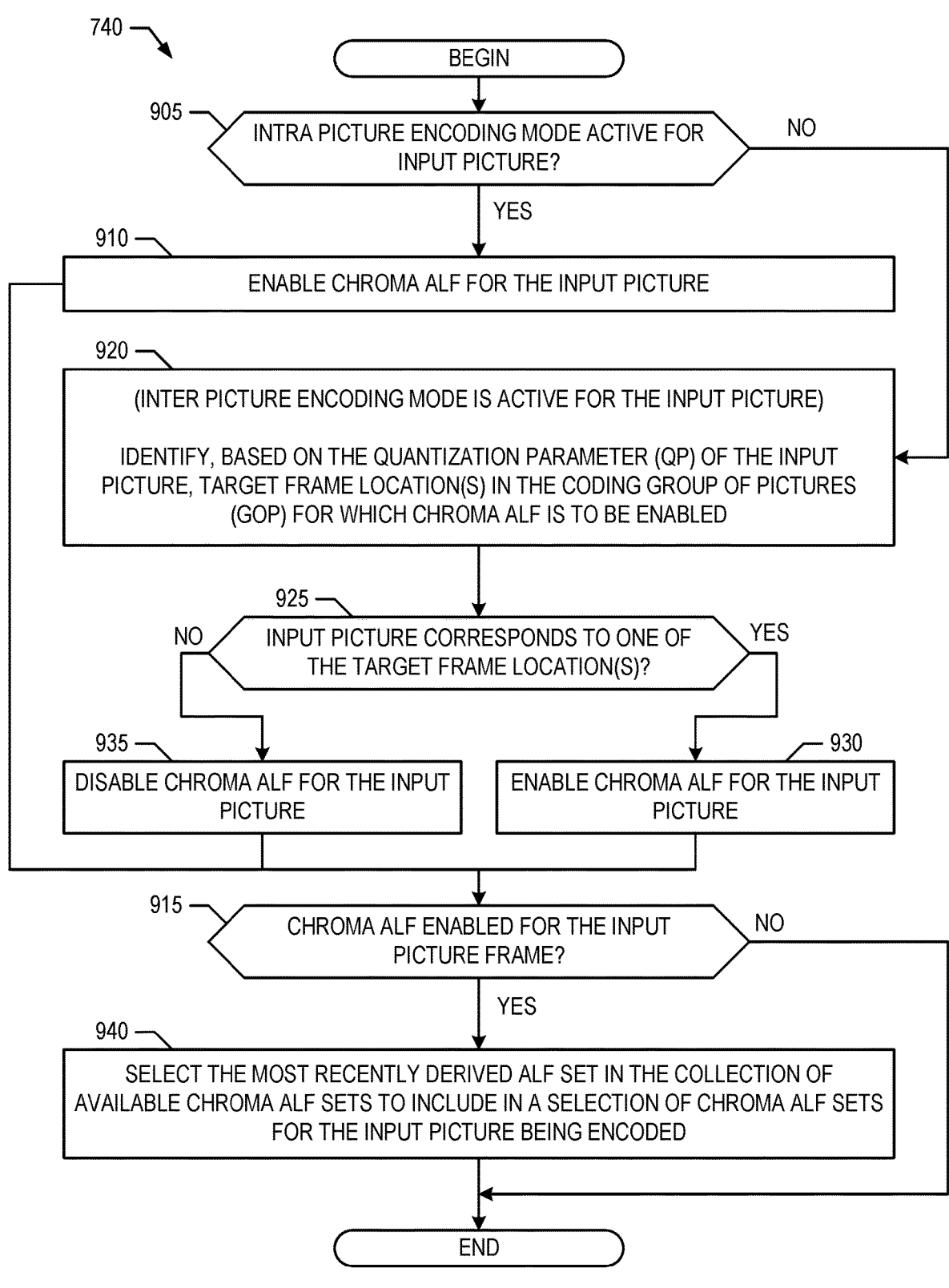

BEGIN

905 — INTRA PICTURE ENCODING MODE ACTIVE FOR INPUT PICTURE?          NO

YES

910 — ENABLE CHROMA ALF FOR THE INPUT PICTURE

920 — (INTER PICTURE ENCODING MODE IS ACTIVE FOR THE INPUT PICTURE)

IDENTIFY, BASED ON THE QUANTIZATION PARAMETER (QP) OF THE INPUT PICTURE, TARGET FRAME LOCATION(S) IN THE CODING GROUP OF PICTURES (GOP) FOR WHICH CHROMA ALF IS TO BE ENABLED

925 — INPUT PICTURE CORRESPONDS TO ONE OF THE TARGET FRAME LOCATION(S)?

NO                                                              YES

935 — DISABLE CHROMA ALF FOR THE INPUT PICTURE

930 — ENABLE CHROMA ALF FOR THE INPUT PICTURE

915 — CHROMA ALF ENABLED FOR THE INPUT PICTURE FRAME?          NO

YES

940 — SELECT THE MOST RECENTLY DERIVED ALF SET IN THE COLLECTION OF AVAILABLE CHROMA ALF SETS TO INCLUDE IN A SELECTION OF CHROMA ALF SETS FOR THE INPUT PICTURE BEING ENCODED

END

FIG. 9

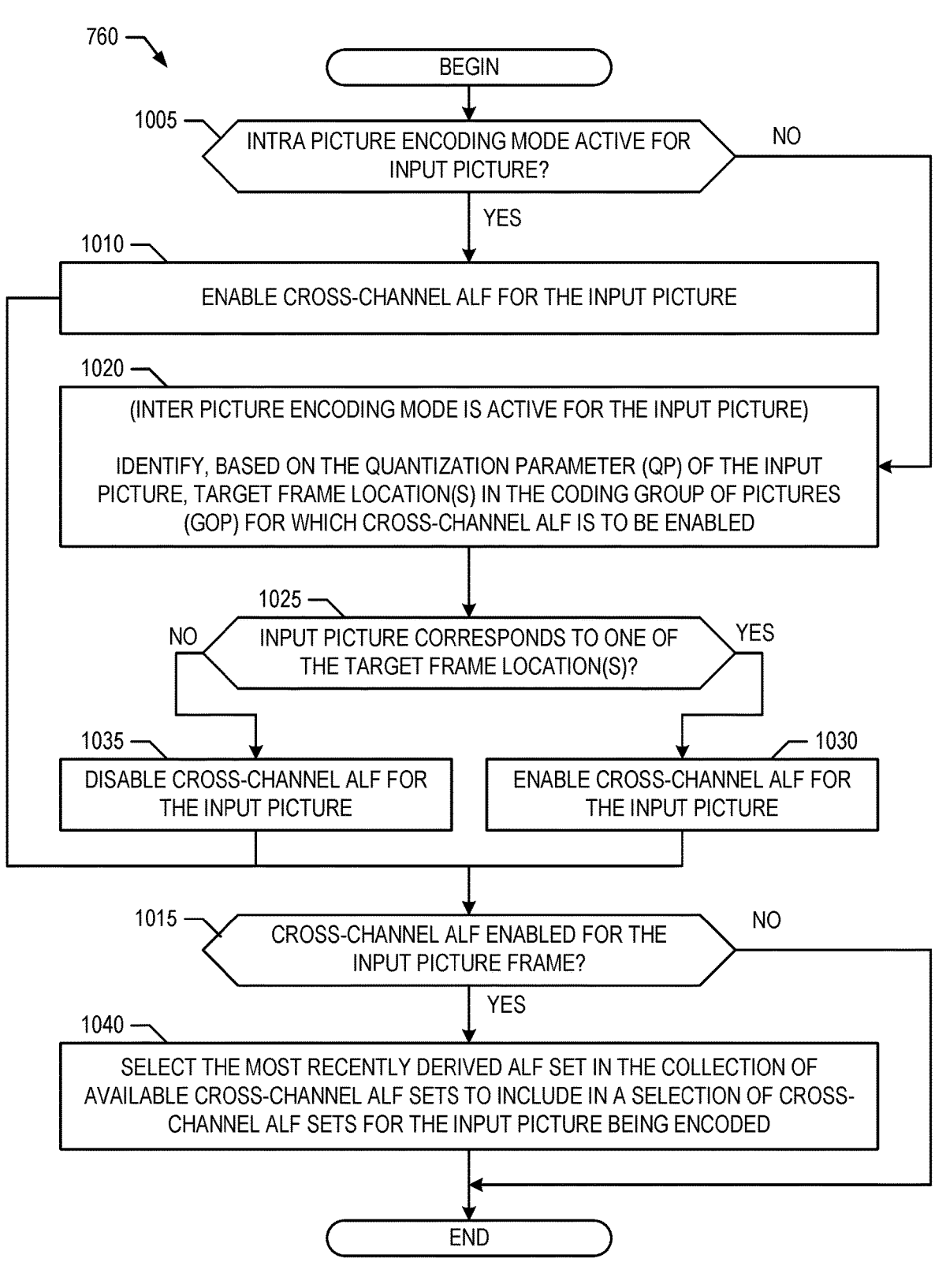

760

BEGIN

1005 — INTRA PICTURE ENCODING MODE ACTIVE FOR INPUT PICTURE?          NO

YES

1010 — ENABLE CROSS-CHANNEL ALF FOR THE INPUT PICTURE

1020 — (INTER PICTURE ENCODING MODE IS ACTIVE FOR THE INPUT PICTURE)

IDENTIFY, BASED ON THE QUANTIZATION PARAMETER (QP) OF THE INPUT PICTURE, TARGET FRAME LOCATION(S) IN THE CODING GROUP OF PICTURES (GOP) FOR WHICH CROSS-CHANNEL ALF IS TO BE ENABLED

1025 — NO          INPUT PICTURE CORRESPONDS TO ONE OF THE TARGET FRAME LOCATION(S)?          YES

1035 — DISABLE CROSS-CHANNEL ALF FOR THE INPUT PICTURE

ENABLE CROSS-CHANNEL ALF FOR THE INPUT PICTURE — 1030

1015 — CROSS-CHANNEL ALF ENABLED FOR THE INPUT PICTURE FRAME?          NO

YES

1040 — SELECT THE MOST RECENTLY DERIVED ALF SET IN THE COLLECTION OF AVAILABLE CROSS-CHANNEL ALF SETS TO INCLUDE IN A SELECTION OF CROSS-CHANNEL ALF SETS FOR THE INPUT PICTURE BEING ENCODED

END

FIG. 10

ADAPTIVE LOOP FILTER CLASSIFICATION AND SELECTION FOR VIDEO CODING

FIELD OF THE DISCLOSURE

This disclosure relates generally to video coding and, more particularly, to adaptive loop filter classification and selection for video coding.

BACKGROUND

Versatile Video Coding (VVC) is a next generation video codec defined in the H.266 standard (e.g., Release 2.0, dated Apr. 29, 2022) promulgated by the International Telecommunication Union (ITU) Telecommunication Standardization Sector (ITU-T). The VVC video codec is an improvement over prior video codecs, such as the High Efficiency Video Coding (HEVC) and Advanced Video Coding (AVC) video codecs. One feature implemented in VVC is the adaptive loop filter (ALF), which is included in a VVC codec to remove coding artifacts while improving objective quality measurements relative to prior video codecs. At a high-level, the ALF of the VVC decoder includes a luma ALF to filter luma components of a decoded picture corresponding to an encoded picture of a video, a chroma ALF to filter chroma components of the decoded picture, and a cross-channel ALF to adjust the chroma components of the decoded picture based on its luma components. The VVC encoder is responsible for deriving sets of ALFs for the luma and chroma components of an input picture being encoded, as well as sets of ALFs for cross-channel filter, and then encoding and sending the parameters of those ALF sets to the VVC decoder for use when performing adaptive loop filtering in the context of decoding that encoded picture.

BRIEF DESCRIPTION OF THE DRAWINGS

FIGS. 7-10 are flowcharts representative of example machine readable instructions and/or example operations that may be executed by example processor circuitry to implement the adaptive loop filter selection functionality included in the example video encoders of FIGS. 1 and/or 4.

In general, the same reference numbers will be used throughout the drawing(s) and accompanying written description to refer to the same or like parts. The figures are not to scale.

Figure 1:
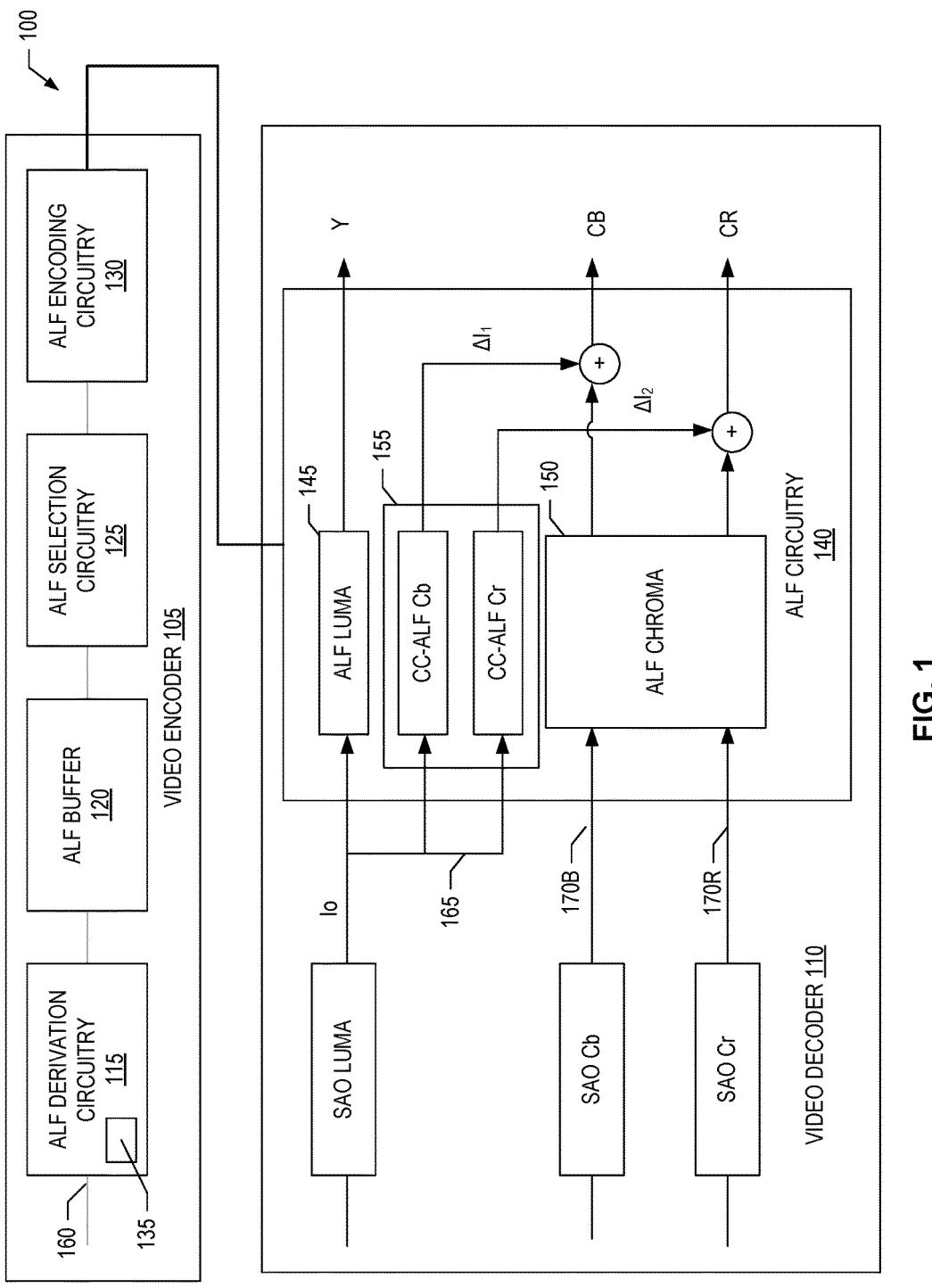
FIG. 1 is a block diagram of an example video encoder and an example video decoder that implement adaptive loop filter classification and selection in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Example methods, apparatus, systems and articles of manufacture (e.g., physical storage media) to implement adaptive loop filter classification and selection for video coding are disclosed herein. As noted above, an adaptive loop filter (ALF) implemented by a VVC decoder can include a luma ALF to filter luma components of a decoded picture corresponding to an encoded picture of a video, a chroma ALF to filter chroma components of the decoded picture, and a cross-channel ALF to adjust the chroma components of the decoded picture based on its luma components. The luma ALF utilizes sets of 7×7 diamond shape symmetric filters each with 12 filter coefficients. Each luma ALF filter set can include up to 25 filters that correspond respectively to 25 different classes. The chroma ALF utilizes sets of 5×5 diamond shape symmetric filters each with 6 filter coefficients. Each chroma ALF filter set include up to 8 filters. For each filter coefficient in the luma and chroma ALFs, clipping parameters (e.g., with up to 4 different options) are signaled from the VVC encoder to the VVC decoder, and are applied to the ALF to reduce excessive filtering impact of neighboring pixels. The cross-channel ALF utilizes sets of 3×4 diamond filters each with 7 filter coefficients. Each cross-channel ALF filter set can include up to 4 filters.

As noted above, the VVC encoder is responsible for deriving the luma, chroma and cross-channel ALF filter set(s). If the VVC encoder derives a new ALF filter set for a given input frame undergoing encoding, the parameters of the derived ALF filter set are encoded in an adaptation parameter set (APS) and can be used for adaptive loop filtering of the current frame and subsequent frames. For adaptive loop filtering of luma components, up to 8 derived filter sets can be encoded and stored in and APS buffer for a given picture. Additionally, there are 16 default luma ALF filter sets defined by the VVC standard. Thus, for each coding tree unit (CTU), the VVC encoder can select up to 24 different luma ALF filter sets to signal to the VVC decoder for a given input picture. Similarly, the VVC encoder can select up to 8 different chroma ALF filter sets and 8 different cross-channel ALF filter sets to signal to the VVC decoder for a given input picture. Furthermore, depending on the total number of filter sets used for each picture (e.g., frame) of a video, different length entropy coding is applied for each coding tree block (CTB).

Although the ALF operation is straightforward in the decoder, the encoder operations to decide the number of ALF filter sets for each picture frame can be computationally complex. For example, in the VVC test model (VTM) reference design specified in the H.266 standard (e.g., Release 2.0, dated Apr. 29, 2022), the VVC encoder is expected to perform multiple pass searching (e.g., with up to 17 passes for the luma dimension and 8 passes for the chroma dimension) to calculate the rate distortion (RD) cost of all possible luma and chroma ALF filter set selections to determine the number of filter sets and which filter sets are to be used for each picture frame. Furthermore, in the VTM reference design, the picture level on/off decisions for the luma ALF, the chroma ALF and the cross-channel ALF must wait until after all CTU-level decisions have been made. Thus, the VTM reference design for ALF filter set selection has high complexity and is not feasible for hardware implementations that employ parallel acceleration.

Furthermore, in the VTM reference design, the encoder is expected to obtain the statistics used to derive an ALF filter set for a current input picture by buffering the statistics of all 25 classes for each CTU over the entire input picture. When non-linear clipping is enabled, the memory requirements in the encoder are further increased by 16 times for deriving the filter. Thus, for a hardware implementation, the VTM reference design requires substantial gate counts in the encoder to buffer the statistics, which may be difficult to realize in a real-world application.

In contrast with implementations based on the VTM reference design, disclosed example solutions for ALF filter selection utilize one or a combination of up to three algorithms to select the number luma ALF filter sets for a given input picture without performing a multiple pass search over the collection of available ALF filter sets. In some disclosed example ALF filter selection solutions, up to three (3) previously derived luma ALF filters sets and a newly derived luma ALF filter set can be selected for the current input picture. As disclosed in further detail below, ALF filter selection solutions based on the coding structure and quantization parameter (QP) for the input picture have also been developed for picture level chroma ALF on/off selection and cross-channel ALF on/off selection. In disclosed examples, such picture level decisions are made before any CTU level decisions. Thus, the disclosed example solutions support true single pass implementations. Furthermore, because the picture level ALF filter sets are decided before any CTU level filter decisions, disclosed example solutions support hardware pipelining.

For example, disclosed ALF filter selection solutions include up to three different algorithms that a video encoder can implement to select the number of luma ALF filter sets for a given input picture being encoded without performing a multiple pass search. In a first example ALF filter selection algorithm, the encoder selects the number of luma ALF filter sets based on a pattern and the collection of available luma ALF filter sets for the given input picture. For example, the selection of the luma ALF filter sets from the collection of available filter sets can be based on an order in which the different available luma ALF filter set in the collection were derived. In a second example ALF filter selection algorithm, the encoder adjusts number of luma ALF filter sets to include in the selection of ALF filter sets for the given input picture based on the video resolution of the input picture. In some examples, the second example ALF filter selection algorithm causes more luma ALF filters sets to be selected for a higher resolution video than for a lower resolution video. In a third example ALF filter selection algorithm, the encoder adjusts the number of luma ALF filter sets to include in the selection of ALF filter sets for the given input picture based on the quantization parameter (QP) used to encode the input picture. In some examples, the third example ALF filter selection algorithm causes more luma ALF filters sets to be selected for pictures encoded with lower QP than pictures encoded with a higher QP. For chroma ALF filter set selection and cross channel ALF filter set selection, disclosed example ALF filter selection solutions utilize the coding structure and the QP of a given input picture to select whether the chroma ALF and/or the cross-channel CCALF ALF is to be enabled for that input picture. In some examples, selection of the particular filters to include in the chroma ALF and/or the cross-channel CCALF ALF filter set is based on the order in which the available chroma ALF filters and/or the cross-channel CCALF ALF filters were derived.

In contrast with implementations based on the VTM reference design, disclosed example solutions for ALF filter classification provide one or more classification mapping solutions to reduce memory utilization. In some examples, ALF filter classification is based on spatial activity, directionality, and/or a most probable class decision. For example, disclosed ALF filter classification solutions can map the 25 different classes used for ALF filter derivation to a smaller number of classes such that new filter derivations can be performed with just the statistics associated with the reduced number of classes. As such, memory requirements and complexity are reduced for disclosed example ALF filter classification solutions relative to the VTM reference design.

For example, disclosed ALF filter classification solutions include three different algorithms that can be implemented by the video encoder to map the full set of 25 class statistics to a smaller number of classes. In a first example ALF filter classification algorithm, the classification mapping is reduced based on block spatial activities. In a second example ALF filter classification algorithm, the classification mapping is reduced based on local directionality. In a third example ALF filter classification algorithm, the classification mapping is reduced based on a combination of the first and/or the second disclosed filter classification algorithms and a most probable class identified the previous encoded picture frames.

These and other example methods, apparatus, systems and articles of manufacture (e.g., physical storage media) to implement adaptive loop filter classification and selection for video coding are disclosed in further detail below.

Turning to the figures, FIG. 1 is a block diagram of an example video coding system 100 including an example video encoder 105 and an example video decoder 110 that implement adaptive loop filter classification and selection in accordance with teachings of this disclosure. FIG. 1 depicts portions of the video encoder 105 and the video decoder 110 that relate to an example ALF design that is in accordance with teachings of this disclosure. Portions of the video encoder 105 and the video decoder 110 related to other video codec functionality are omitted for clarity. The example video encoder 105 and/or the example video decoder 110 of FIG. 1 may be instantiated (e.g., creating an instance of, bring into being for any length of time, materialize, implement, etc.) by processor circuitry such as a central processing unit executing instructions. Additionally or alternatively, the video encoder 105 and/or the video decoder 110 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

The example video encoder 105 of FIG. 1 includes example ALF derivation circuitry 115, an example ALF buffer 120, example ALF selection circuitry 125 and example ALF encoding circuitry 130. In the illustrated example, the ALF selection circuitry 125 implements one or more example ALF selection algorithms disclosed herein to select luma, chroma and/or cross-channel ALF sets for a given input picture from collections of available luma, chroma and/or cross-channel ALF sets stored in the ALF buffer 120. In the illustrated example, the ALF derivation circuitry 115 includes example ALF classification circuitry 135 that implements one or more example ALF filter classification algorithms disclosed herein to reduce the number of class statistics to be used for ALF filter derivation. In the illustrated example, the ALF encoding circuitry 130 encodes the selected ALF filter sets into an APS to be signaled to the example video decoder 110.

In the illustrated example, the video decoder 110 includes example ALF circuitry 140. The example ALF circuitry 140 of FIG. 1 implements an example luma ALF 145, an example chroma ALF 150 and an example cross-channel ALF 155. In the illustrated example, the luma ALF 145 utilizes the luma ALF filter sets signaled by the video encoder 105 to perform adaptive loop filtering of luma components of a reconstructed picture corresponding to the original input picture for which the luma ALF filter sets were determined. Similarly, in the illustrated example, the chroma ALF 150 utilizes the chroma ALF filter sets signaled by the video encoder 105 to perform adaptive loop filtering of chroma components of the reconstructed picture corresponding to the original input picture for which the chroma ALF filter sets were determined. Likewise, in the illustrated example, the cross-channel ALF 155 utilizes the cross-channel ALF filter sets signaled by the video encoder 105 to perform cross-channel adaptive loop filtering of the reconstructed picture corresponding to the original input picture for which the cross-channel ALF filter sets were determined.

In the illustrated example, the luma ALF 145, the chroma ALF 150 and the cross-channel ALF 155 implemented by the ALF circuitry 140 utilize adaptive wiener filtering to minimize the difference between luma and chroma components of an example original input picture 160 of a video sequence and corresponding example luma components 165 and example blue and red chroma components 170B/170R of a reconstructed output (e.g., such as the sample adaptive outputs (SAOs) in VVC) formed by the decoder 110 when decoding an encoded version of the original picture. At a video sequence level, a first flag (e.g., sps_alf_enabled_flag) may be used to enable adaptive loop filtering. Corresponding picture level and slice level flags (e.g., ph_alf_enabled_flag and slice_alf_enabled_flag) may be used to enable adaptive loop filtering for a given picture or slice. At a CTB level, three flags (e.g., alf_ctb_flag[3]) may be used to adaptively enable adaptive loop filtering per CTB for the luma (Y), blue chroma (Cb) and red chroma (Cr) components, respectively.

Figure 2:
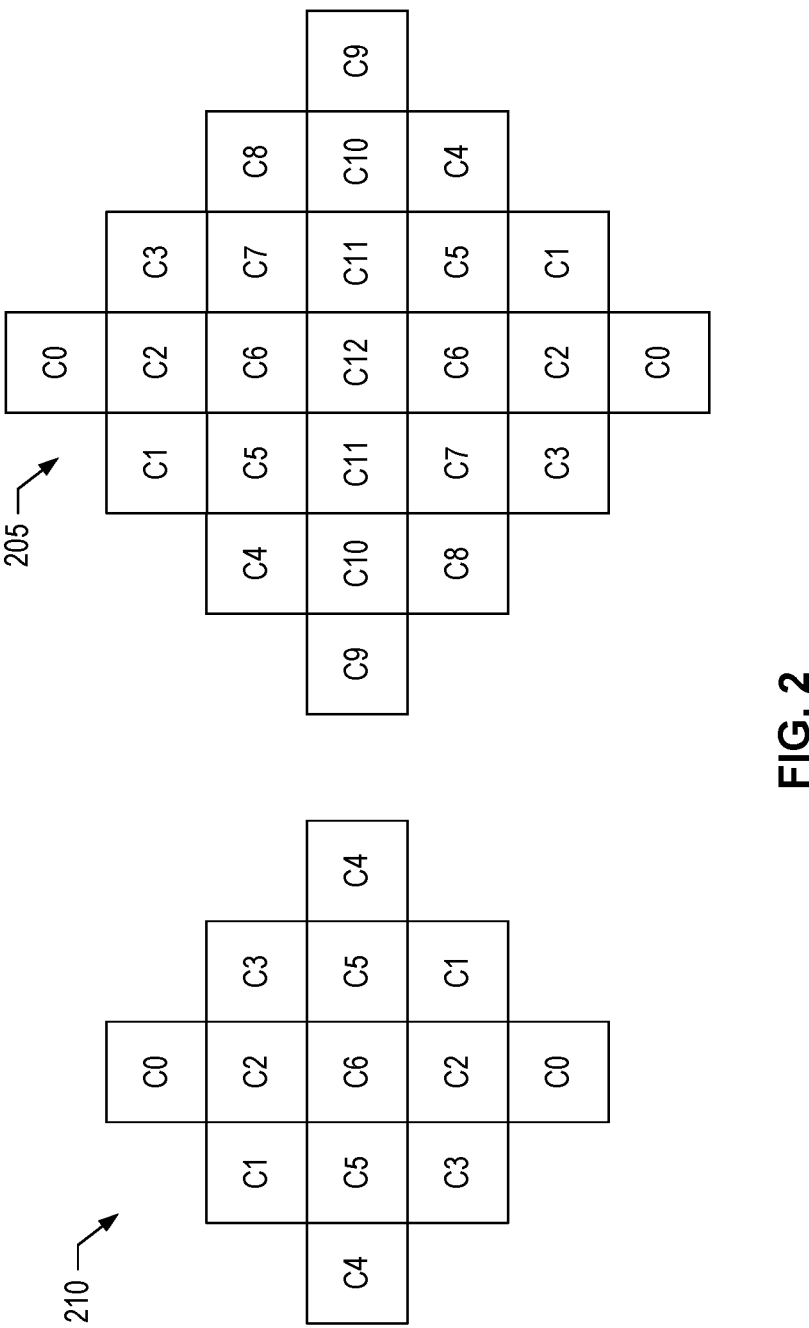
FIG. 2 illustrates example adaptive loop filter structures employed by the example video encoder and the example video decoder of FIG. 1.

As described above and in further detail below, the encoder 105 generates the ALF coefficients for the luma, chroma and cross-channel ALFs, and signals them to the decoder 110 (e.g., as part of the encoded video sequence). In the illustrated example, the luma ALF 145, the chroma ALF 150 and the cross-channel ALF 155 implement respective, different symmetric diamond filter shapes for luma, chroma and cross-channel filtering, with the same chroma filter being shared by both the blue chroma (Cb) and red chroma (Cr) components. FIG. 2 illustrates an example luma ALF structure 205 used by the luma ALF 145 to filter the luma components 165 of the reconstructed picture. FIG. 2 also illustrated an example chroma ALF structure 210 used by the chroma ALF 1590 to filter the Cb and Cr chroma components 170B/170R of the reconstructed picture. In the illustrated example of FIG. 2, the luma ALF structure 205 has a 7×7 symmetric diamond shape with 12 coefficients to be signaled per filter (with the $13^{th}$ coefficient being derivable from the other 12 coefficients). In the illustrated example of FIG. 2, the chroma ALF structure 21 has a 5×5 symmetric diamond shape with 6 coefficients to be signaled per filter with the $7^{th}$ coefficient being derivable from other 6 coefficients).

The filtering performed by the luma ALF 145 and the chroma ALF 150 for a given input pixel can be described mathematically by Equation 1, which is:

$$O'(x, y) = I(x, y) + \sum_{(i,j)\neq(0,0)} w(i, j).(I(x+i, y+j) - I(x, y)) \quad \text{Equation 1}$$

In Equation 1, I(x, y) represented the input pixel component (e.g., luma, Cb chroma or Cr chroma to be filters, and w(i, j) represents the corresponding filter (e.g., the luma ALF 145 for luma components and the chroma ALF 150 for Cb chroma or Cr chroma components). In some examples, to reduce the filtering impact of neighboring pixels, the luma ALF 145 and/or the chroma ALF 150 apply clipping to the differences between current pixel and neighboring pixels. Such clipping can be represented mathematically by modifying Equation 1 to be Equation 2, which is:

$$O'(x, y) = \quad \text{Equation 2}$$
$$I(x, y) + \sum_{(i,j)\neq(0,0)} w(i, j).K(I(x+i, y+j) - I(x, y), k(i, j))$$

In Equation 2, K(d, b)=min(b, max (−b, d)), where k(i, j) are the clipping parameters signaled by the encoder 105 to the decoder 110 in the encoded video bitstream. Table 1 illustrates an example message structure used by the ALF encoding circuitry 130 to signal ALF clipping parameters to the decoder 110. In the example of Table 1, for each signaled luma filter and chroma filter, one set of k(i, j) is signaled. The ALF derivation circuitry 115 of the encoder 105 also derives the clipping values for the filter coefficients. For example, for each luma filter, 12 clipping values are derived and signaled, with one clipping value for each filter coefficient position, and for each chroma filter, 6 clipping value indices are derived and signaled. In some examples, each filter coefficient can also have 4 different clipping options. Thus, the total number of filter combinations can be large and impractical to search through with an exhaustive search. As a result, the VTM reference design specifies a fast searching method, which reduces the total number of searches to the range of about 60.

TABLE 1

```
Alf_luma_filter_signal_flag
....
If( alf_luma_filter_signal_flag ) {
    alf_luma_clip_flag
    alf_luma_num_filters_signalled_minus1
    if( alf_luma_num_filters_signalled_minus1 > 0 ) {
        for( filtIdx = 0; filtIdx < NumAlfFilters; filtIdx++ )
            alf_luma_coeff_delta_idx[ filtIdx ]
    }
    ...
}
```

In the example decoder 110 of FIG. 1, the cross-channel ALF 155 utilizes the luma components 165 of the reconstructed picture to refine the Cb and Cr chroma components 170B/170R of the reconstructed picture. The example cross-channel ALF 155 has a 3×4 diamond shape with 7 coefficients to be signaled per filter. The filtering performed by the cross-channel ALF 155 for a given input pixel can be described mathematically by Equation 3, which is:

$$\Delta I_i(x, y) = \sum_{(x_0,y_0)\in S_i} I_0(x_Y + x_0, y_Y + y_0)c_i(x_0, y_0) \quad \text{Equation 3}$$

In Equation 3, (x, y) represents the location of the chroma component i, where i=b for the blue Cb chroma components 170B and i=r for the blue Cr chroma components 170R. In Equation 3, $(x_Y, y_Y)$ represents the luma component location based on the chroma component (x, y), $S_i$ represents filter support area over the luma component, and $c_i(x_0, y_0)$ represents the coefficients of the cross-channel ALF 155. In some examples, up to 4 alternative cross-channel ALF filter sets are signaled by the encoder 105 for the Cb and Cr chroma components, respectively, such as in an adaptive parameter set (APS). In some examples, separate cross-channel ALF control flags and filter identifiers (e.g., APS identifies) are signaled in the picture header or the sequence header for the Cb and Cr cross-channel ALF filter sets. In some examples, separate CTB-level filter control flags and filter indices are also signaled for the Cb and Cr cross-channel ALF filter sets.

In the illustrated example of FIG. 1, if a new ALF filter set is derived by the ALF derivation circuitry 115 for a given input picture, the ALF filter set parameters are stored in the ALF buffer 120 (e.g., encoded in an APS) and can be used by the current input picture (or frame) and subsequent picture (or frames) of the video sequence. In the illustrated example, up to 8 derived luma ALF filter sets can be derived and stored in the ALF buffer 120 for a given input frame. Also, there are 16 default ALF filter sets defined by the VVC standard. For each input picture, luma adaptive loop filtering can be adaptively enabled or disabled at the picture level. If picture level luma adaptive loop filtering is enabled, the picture level luma ALF filter set selections are signaled by the encoder 105 (e.g., by the ALF encoding circuitry 130) in the picture header or the slice header, with the signaling including the number of luma ALF filter sets (e.g., slice_num_alf_aps_ids_luma) and the corresponding luma ALF filter set ID (e.g., slice_alf_aps_id_luma[i]), as shown in the example of Table 2.

TABLE 2

```
if( sps_alf_enabled_flag && !alf_info_in_ph_flag ) {
    slice_alf_enabled_flag
    if( slice_alf_enabled_flag ) {
        slice_num_alf_aps_ids_luma
        for( i = 0; i < slice_num_alf_aps_ids_luma; i++ )
            slice_alf_aps_id_luma[ i ]
```

In the illustrated example of FIG. 1, for each CTB of a given input picture, luma adaptive loop filtering, chroma adaptive loop filtering and cross-channel adaptive loop filtering can be adaptively enabled or disabled. If luma adaptive loop filtering is enabled, the ALF selection circuitry 125 has up to 24 choices of which luma ALF filter sets can be selected for luma adaptive loop filtering associated with the given input picture. If chroma adaptive loop filtering is enabled, the ALF selection circuitry 125 has up to 8 choices of which chroma ALF filter sets can be selected for chroma adaptive loop filtering associated with the given input picture. If cross-channel adaptive loop filtering is enabled, the ALF selection circuitry 125 has up to 8 choices of which cross-channel ALF filter sets can be selected for cross-channel adaptive loop filtering associated with the given input picture. For example, depending on the total number of luma ALF filter sets selected by the ALF selection circuitry 125 for a given picture frame or slice, different length entropy coding is applied to code the luma ALF filter set identifier (e.g., alf_luma_prev_filter_idx) for each CTB, as shown in the example of Table 3.

TABLE 3

```
alf_ctb_flag[ 0 ][ CtbAddrX ][ CtbAddrY ]
if( alf_ctb_flag[ 0 ][ CtbAddrX ][ CtbAddrY ] ) {
    if( slice_num_alf_aps_ids_luma > 0 )
        alf_use_aps_flag
    if( alf_use_aps_flag ) {
        if( slice_num_alf_aps_ids_luma > 1 )
            alf_luma_prev_filter_idx
    } else
        alf_luma_fixed_filter_idx
    }
```

To achieve the good quality gain, the VTM reference design specified in the VVC standard utilizes a multiple pass search with up to 17 passes luma adaptive loop filtering and 8 passes for chroma and cross-channel adaptive loop filtering to calculate the rate-distortion (RD) cost of all possible filter set selections to decide (i) whether to enable picture level adaptive loop filtering, (ii) the number of ALF filter sets to include in the selections for the luma, chroma and cross-channel components, and (iii) which ALF filter sets are used for each picture frame. Thus, the complexity of the VTM reference design for ALF filter set selection is high, and is not feasible for implementation in hardware with parallel acceleration.

In addition, aspects of the VTM reference design related to block classification for use in generating the individual ALF filters to include in a given ALF filter set are also not feasible for hardware implementation. As noted above, one or more luma ALF filter sets are selected by the encoder 105 for a given picture and signaled to the decoder 110 for use by the luma ALF 145 to perform adaptive loop filtering of the luma components 165 of the reconstructed version of that picture. In the illustrated example of FIG. 1, for each CTB of the reconstructed picture, the luma ALF 145 selects one of the signaled luma ALF filter sets to perform adaptive loop filtering of that CTB. Then, for individual CTBs, the luma ALF 145 selects, based on classifications determined for the CTBs, individual filters from the selected luma ALF filter set to perform adaptive loop filtering of the luma components of those CTBs. An example operation 300 performed by the luma ALF 145 to perform CTB-level luma adaptive loop filtering is illustrated in FIG. 3.

Figure 3:
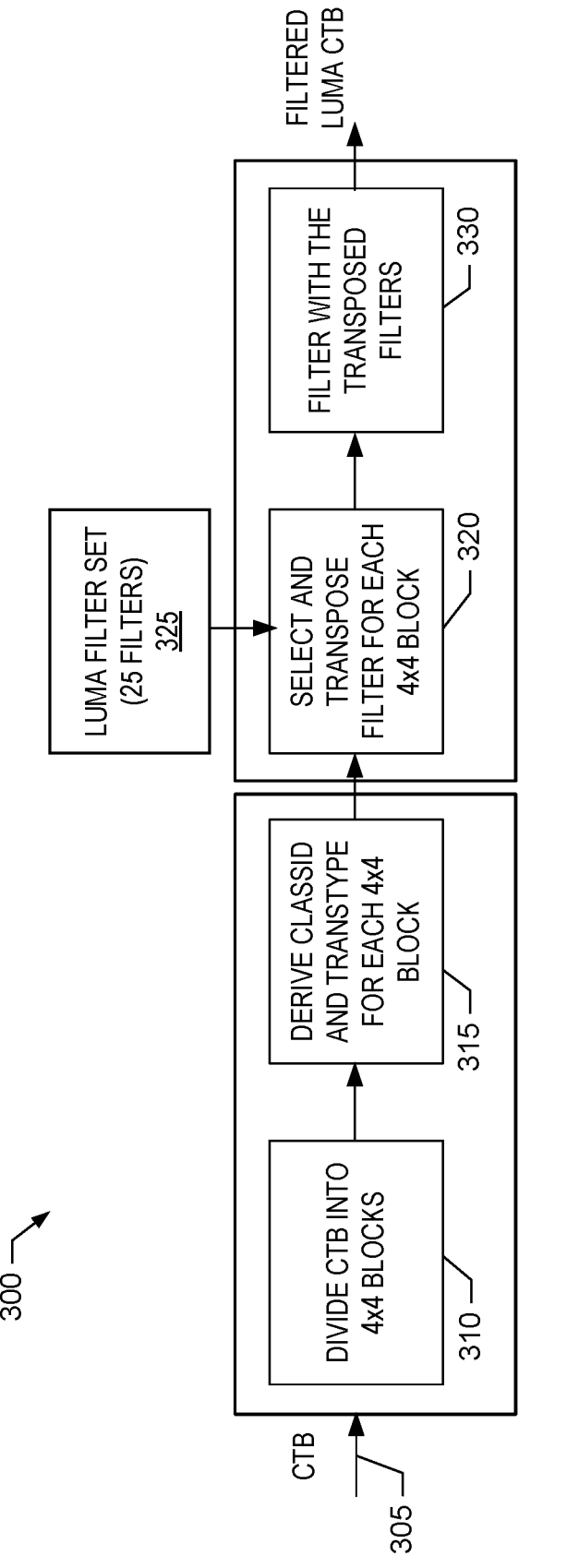
FIG. 3 is a block diagram illustrating an example operation of a luma adaptive loop filter included in the example video decoder of FIG. 1.

In the illustrated example of FIG. 3, when the luma ALF 145 is enabled and applied to an example luma CTB 305 of a given reconstructed picture, the luma ALF 145 divides the CTB luma block into 4×4 sub-blocks at example operation 310. At example operation 315, the luma ALF 145 performs block classification of each sub-block to determine the class identifier for the sub-block. In some examples, up to 25 classes are defined that correspond respectively to up to 25 filters included in one luma ALF filter set (with one filter per class). In some examples, at operation 315, the luma ALF 145 also determines one of 4 transpose types to apply to the luma ALF filter coefficients before they are used to filter the corresponding 4×4 sub-block. At operation 320, for a given 4×4 sub-block, the luma ALF 145 selects a particular filter from an example ALF filter set 325 based on the class identifier for the sub-block, and applies the selected transpose type to that filter, if appropriate. As noted above, the ALF filter set 325 is one of the one or more luma ALF filter sets signaled by the encoder 105 for the given picture being processed. At operation 330, the luma ALF 145 performs adaptive loop filtering of the 4×4 sub-blocks of the CTB 305 based on their respectively selected (and transposed) filters. In this way, the ALF 145 implements class-dependent adaptive loop filtering of each 4×4 block of the CTB 305.

To reduce the APS syntax overhead of signaling all 25 luma filters in a given luma ALF filter set, a VVC encoder can adaptively merge groups of block classes to use the same filter. In prior VVC encoder reference designs, the merging of classes is done based on RD cost. In some examples, the VVC encoder can signal a given luma ALF filter set using the APS parameters shown in Table 4. For example, as shown in Table 4, the VVC encoder can signal the number of different filters (e.g., alf_luma_num_filters_signalled_minus1) for the new luma ALF filter set, which signaled filter (e.g., alf_luma_coeff_delta_idx[filtIdx]) should be used for each block class, etc. However, to implement such classification merging, the VTM reference design searches thousands of merges combinations, even with a non-exhaustive searching method. The RD cost used to evaluate the different merge combinations is calculated based on the statistics for each class, which are accumulated and stored over the entire input picture frame. Considering there are 25 classes in total, the memory requirement for storing the statistics over all classes for an entire picture frame can be large and the merging process can be time consuming. In the illustrated example of FIG. 1, the ALF classification circuitry 135 merges block classes without the need to accumulate the block statistics over all 25 classes, thereby reducing the amount of memory utilization and simplifying derivation of the associated ALF filters.

TABLE 4

```
alf_luma_filter_signal_flag
....
if( alf_luma_filter_signal_flag ) {
    alf_luma_clip_flag
```

TABLE 4-continued

```
alf_luma_num_filters_signalled_minus1
if( alf_luma_num_filters_signalled_minus1 > 0 ) {
    for( filtIdx = 0; filtIdx < NumAlfFilters; filtIdx++ )
        alf_luma_coeff_delta_idx[ filtIdx ]
}
...
}
```

Figure 4:
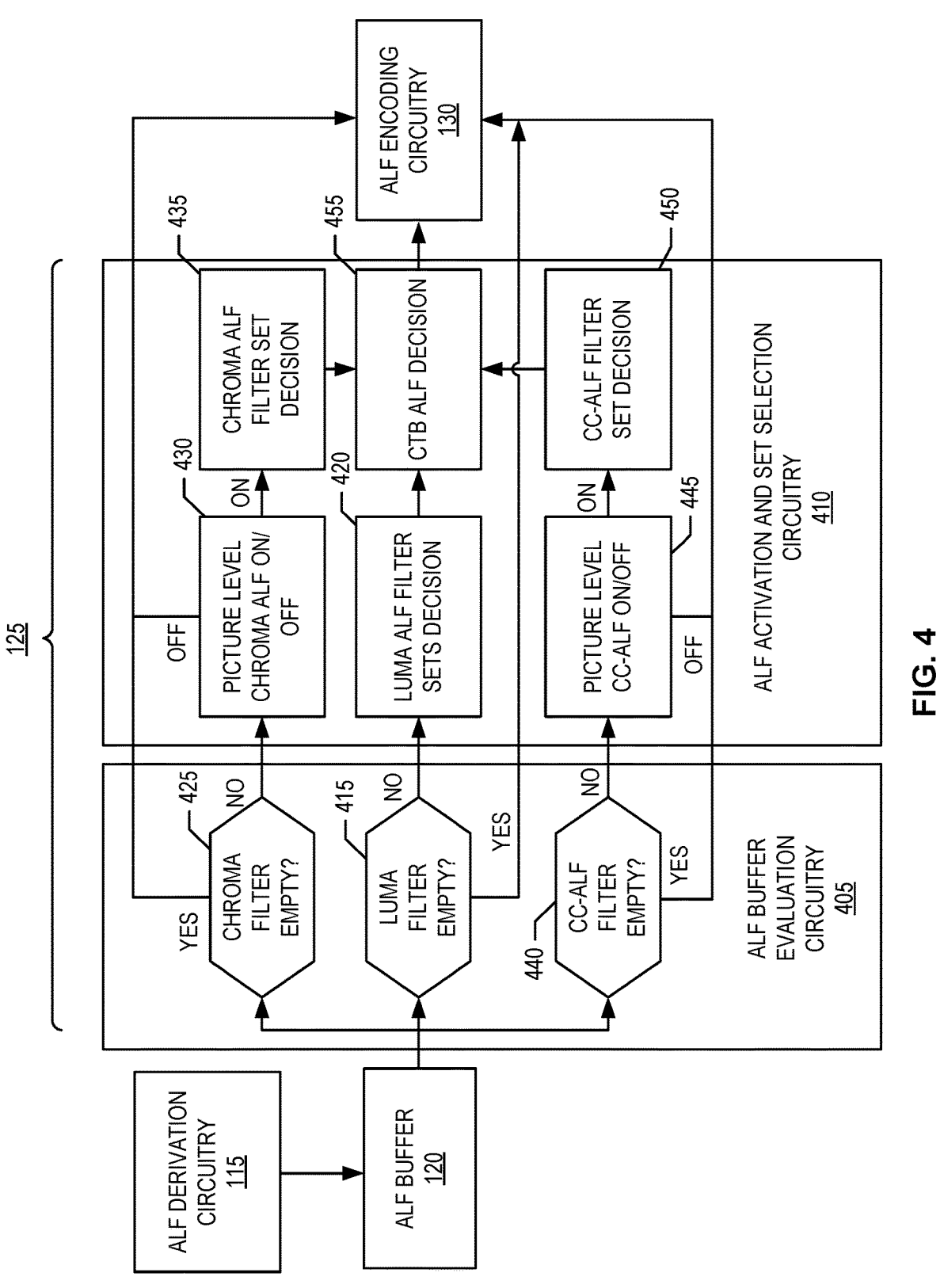
FIG. 4 is a block diagram illustrating an example implementation of the adaptive loop filter selection functionality included in the example video encoder of FIG. 1.

FIG. 4 illustrates an example implementation of the ALF selection circuitry 125 included in the video encoder 105 of FIG. 1. The example ALF selection circuitry 125 of FIG. 4 may be instantiated (e.g., creating an instance of, bring into being for any length of time, materialize, implement, etc.) by processor circuitry such as a central processing unit executing instructions. Additionally or alternatively, the ALF selection circuitry 125 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The example ALF selection circuitry 125 of FIG. 4 includes example ALF buffer evaluation circuitry 405 and example ALF activation and set selection circuitry 410 to implement ALF set selection in accordance with teachings of this disclosure. In the illustrated example of FIG. 4, the ALF buffer evaluation circuitry 405 begins the ALF filter decision process for a current input picture by checking the collection of available luma ALF filter sets, the collection of available chroma ALF filter sets and the collection of available cross-channel ALF filter sets in the ALF buffer 120 of the video encoder 105. For example, if the ALF derivation circuitry 115 of the video encoder 105 does not derive any new ALF filter sets for the current input picture, the ALF APS buffer 120 is kept unchanged. However, if the ALF derivation circuitry 115 derives at least one new ALF filter set for the current picture, the ALF derivation circuitry 115 adds the new filter set to the APS buffer 120. For example, the ALF derivation circuitry 115 may not derive any new ALF filter set(s) for a current input picture if the candidate filter(s) it derives does(do) not satisfy and RD cost target and/or some other criteria. In the illustrated example, if the collection of derived filter sets reaches an upper limit on the number of allowed ALF filter sets (e.g., such as 8 for luma, 8 for chroma, and 8 for cross-channel, or some other value(s)), the oldest available ALF filter set in the collection stored in the ALF buffer 120 is removed and the new ALF filter set is added. After the ALF buffer 120 is updates, the ALF buffer evaluation circuitry 405 evaluates the number of filter sets included in the collection of available luma ALF filter sets, the collection of available chroma ALF filter sets, and the collection of available cross-channel ALF filter sets, respectively.

In the illustrated example, in response to the ALF buffer evaluation circuitry 405 determining the collection of available luma ALF filter sets in APS buffer 120 is not empty (block 415), the ALF activation and set selection circuitry 410 enables luma adaptive loop filtering (and, thus, the luma ALF 145 in the decoder 110) for the current picture (block

420). The ALF activation and set selection circuitry 410 then selects which ones of the collection of available luma ALF filter set(s) to include in the selection of luma ALF filter set(s) for the current picture (e.g., by selecting a number of the available luma ALF filters and their corresponding filter IDs) (block 420). For example, at block 420, the ALF activation and set selection circuitry 410 may limit the selection of luma ALF filter set(s) for the current picture to the one most recently derived luma ALF filter set in the collection of available luma ALF filter set(s). In some examples, at block 420, the ALF activation and set selection circuitry 410 can select at least one (e.g., two or some other number less than an upper limit corresponding to a size of the collection of available luma ALF filter set(s)) of the most recently derived luma ALF filter set in the collection of available luma ALF filter set(s) to include in the selection of luma ALF filter set(s) for the current picture. As described above, the selection of luma ALF filter set(s) in then encoded by the ALF encoding circuitry 130 and sent to the decoder 110 such that the luma ALF 145 at the decoder 110 can perform CTB-level filter decisions based on the signaled selection of luma ALF filter set(s). However, if the collection of available luma ALF filter sets in APS buffer 120 is empty (block 415), the ALF activation and set selection circuitry 410 disables luma adaptive loop filtering (and, thus, the luma ALF 145 in the decoder 110) for the current picture.

In the illustrated example, in response to the ALF buffer evaluation circuitry 405 determining the collection of available chroma ALF filter sets in APS buffer 120 is not empty (block 425), the ALF activation and set selection circuitry 410 determines whether to enable chroma adaptive loop filtering (and, thus, the chroma ALF 150 in the decoder 110) for the current picture based the picture's location within a coding group of pictures (GOP) and the picture-level quantization parameters (block 430). If chroma adaptive loop filtering is enabled for the current picture, then the ALF activation and set selection circuitry 410 selects one of the collection of available chroma ALF filter set(s) to include in the selection of chroma ALF filter set(s) for the current picture, with the selection based on an order in which the collection of available chroma ALF filter set(s) was derived (which can correspond to the location(s) of the collection of available chroma ALF filter set(s) in the ALF buffer 120) (block 435). For example, at block 435, the ALF activation and set selection circuitry 410 may limit the selection of chroma ALF filter set(s) for the current picture to the one most recently derived chroma ALF filter set in the collection of available chroma ALF filter set(s). In some examples, at block 435, the ALF activation and set selection circuitry 410 can select at least one (e.g., two or some other number) of the most recently derived chroma ALF filter set in the collection of available chroma ALF filter set(s) to include in the selection of chroma ALF filter set(s) for the current picture. The selection of chroma ALF filter set(s) in then encoded by the ALF encoding circuitry 130 and sent to the decoder 110 such that the chroma ALF 150 at the decoder 110 can perform CTB-level filter decisions based on the signaled selection of chroma ALF filter set(s). However, if the collection of available chroma ALF filter sets in APS buffer 120 is empty (block 425), the ALF activation and set selection circuitry 410 disables chroma adaptive loop filtering (and, thus, the chroma ALF 150 in the decoder 110) for the current picture.

Similarly, in the illustrated example, in response to the ALF buffer evaluation circuitry 405 determining the collection of available cross-channel ALF filter sets in APS buffer 120 is not empty (block 440), the ALF activation and set selection circuitry 410 determines whether to enable cross-channel adaptive loop filtering (and, thus, the cross-channel ALF 155 in the decoder 110) for the current picture based the picture's location within a coding group of pictures (GOP) and the picture-level quantization parameters (block 445). If cross-channel adaptive loop filtering is enabled for the current picture, then the ALF activation and set selection circuitry 410 selects one of the collection of available cross-channel ALF filter set(s) to include in the selection of cross-channel ALF filter set(s) for the current picture, with the selection based on an order in which the collection of available cross-channel ALF filter set(s) was derived (which can correspond to the location(s) of the collection of available chroma ALF filter set(s) in the ALF buffer 120) (block 450). For example, at block 450, the ALF activation and set selection circuitry 410 may limit the selection of cross-channel ALF filter set(s) for the current picture to the one most recently derived cross-channel ALF filter set in the collection of available cross-channel ALF filter set(s). In some examples, at block 450, the ALF activation and set selection circuitry 410 can select at least one (e.g., two or some other number) of the most recently derived cross-channel ALF filter set in the collection of available cross-channel ALF filter set(s) to include in the selection of cross-channel ALF filter set(s) for the current picture. The selection of cross-channel ALF filter set(s) in then encoded by the ALF encoding circuitry 130 and sent to the decoder 110 such that the cross-channel ALF 155 at the decoder 110 can perform CTB-level filter decisions based on the signaled selection of cross-channel ALF filter set(s). However, if the collection of available cross-channel ALF filter sets in APS buffer 120 is empty (block 440), the ALF activation and set selection circuitry 410 disables cross-channel adaptive loop filtering (and, thus, the cross-channel ALF 155 in the decoder 110) for the current picture.

In the illustrated example of FIG. 4, the ALF activation and set selection circuitry 410 implements CTB-level ALF filter activation decisions to determine whether adaptive loop filtering is to be enabled or disabled for each of the CTBs of the current input picture (e.g., at block 450). Furthermore, if adaptive loop filtering is enabled for a given CTB, and more than one filter set is associated with the current picture, the ALF activation and set selection circuitry 410 (e.g., at block 450) can select the particular adaptive loop filter set for the given CTB. CTB-level selections are then encoded by the ALF encoding circuitry 130 and sent to the decoder 110.

In the illustrated example of FIG. 4, the ALF activation and set selection circuitry 410 implements one or a combination of up to three example algorithms (e.g., at block 420) to select which one(s) of the collection of available luma ALF filter set(s) to include in the selection of luma ALF filter set(s) for the current picture. The first example luma ALF filter set selection algorithm implemented by the ALF activation and set selection circuitry 410 (e.g., at block 420) involves selecting one(s) of the collection of available luma ALF filter set(s) based on a pattern. For example, if the collection of available luma ALF filter set(s) includes no filter sets (is empty), the ALF activation and set selection circuitry 410 disables luma adaptive loop filtering for the current picture. If the collection of available luma ALF filter set(s) includes one filter set, the ALF activation and set selection circuitry 410 enables luma adaptive loop filtering and selects that one available luma ALF filter set for the current picture and, thus, the selection of luma ALF filter sets for the current frame includes just the one filter set. However, if the collection of available luma ALF filter set(s)

includes two or more filter sets, the ALF activation and set selection circuitry 410 selects ones of the available luma ALF filter set for the current picture following a fixed pattern that is based on an order in which the collection of available luma ALF filter set(s) was derived. In a first example, the ALF activation and set selection circuitry 410 selects just one of the filters in collection of available luma ALF filter set(s) to include in the selection of luma ALF filter sets for the current picture. In such an example, the value of sli-ce_num_alf_aps_ids_luma in Table 2 can be set to 1, and no alf_luma_prev_filter_idx coding of Table 3 is needed. Furthermore, the ALF activation and set selection circuitry 410 selects the one available luma ALF filter set for the current picture based on the order in which the available filter sets in the collection were derived. For example, the most recently (or latest) derived luma ALF filter set in the collection of available ALF filter sets may be selected by the ALF activation and set selection circuitry 410. In a second example, the ALF activation and set selection circuitry 410 selects a number N (e.g., with N greater than or equal to 2, but less than the upper limit of 8) of the filters in the collection of available luma ALF filter set(s) to include in the selection of luma ALF filter sets for the current picture. For example, if the number of selected filter sets is 2, the value of slice_num_alf_aps_ids_luma in Table 2 can be set to 2. In this second example, the ALF activation and set selection circuitry 410 selects the N available luma ALF filter sets for the current picture based on the order in which the available filter sets in the collection were derived. For example, the N (e.g., e.g., with N greater than or equal to 2, but less than the upper limit of 8) most recently (or latest) derived luma ALF filter sets in the collection of available ALF filter sets may be selected by the ALF activation and set selection circuitry 410.

The second example luma ALF filter set selection algorithm implemented by the ALF activation and set selection circuitry 410 (e.g., at block 420) involves adjusting the selection of luma ALF filter sets for the current picture based on the video resolution of the current picture such that higher resolution video uses a larger number of luma ALF filter set than lower resolution video. In an example implementation, for video resolution that is less than (or less than or equal to) a resolution threshold (e.g., such as 1080p or some other resolution), the ALF activation and set selection circuitry 410 selects a first number $N_1$ of the collection of available luma ALF filter sets to include in the selection of luma ALF filter sets for the current picture, with the selection based on the order in which the available filter sets in the collection were derived (e.g., such as the $N_1$ most recently derived available luma ALF filter sets). However, for video resolution that is greater than (or greater than or equal to) the resolution threshold (e.g., such as 1080p or some other resolution), the ALF activation and set selection circuitry 410 selects a larger second number $N_2$ of the collection of available luma ALF filter sets to include in the selection of luma ALF filter sets for the current picture (with $N_2 > N_1$), with the selection based on the order in which the available filter sets in the collection were derived (e.g., such as the $N_2$ most recently derived available luma ALF filter sets). For example, if $N_1=1$ and $N_2=2$, then slice_num_alf_aps_id-s_luma of Table 2 is set to a value of 1 if the collection of available luma ALF filter sets is larger than 2 and the video resolution is less than (or less than or equal to) the resolution threshold; otherwise, slice_num_alf_aps_ids_luma of Table 2 is set to a value of 2 if the collection of available luma ALF filter sets is larger than 2 and the video resolution is greater than (or greater than or equal to) the resolution threshold.

The third example luma ALF filter set selection algorithm implemented by the ALF activation and set selection circuitry 410 (e.g., at block 420) involves adjusting the selection of luma ALF filter sets for the current picture based on the quantization parameter (QP) used to encode the current picture, such that a picture encoded with a lower QP uses a larger number of luma ALF filter set than a picture encoded with a higher QP. In some examples, for the same resolution video, the ALF activation and set selection circuitry 410 reduces the number of selected luma ALF filter sets for the current picture by 1 (e.g., assuming the collection of available luma ALF filter sets contains more than 1 filter set) if the QP for the current picture is larger than (or larger than or equal to) a first QP threshold (e.g., such as a value of 40 or some other QP value). However, the ALF activation and set selection circuitry 410 increases the number of selected luma ALF filter sets for the current picture by 1 (if there are one or more unselected filter sets in the collection of available luma ALF filter sets) if the QP for the current picture is less than (or less than or equal to) a second QP threshold (e.g., such as a value of 20 or some other QP value). In some examples, the second QP threshold is lower than the first QP threshold. In some examples, the second QP threshold equals the first QP threshold.

With respect to chroma ALF filter set selection, if the collection of available chroma ALF filter sets in APS buffer 120 is not empty, the ALF activation and set selection circuitry 410 (e.g., at block 430) determines whether to enable chroma adaptive loop filtering for the current picture based on the current picture's location within the coding GOP and the QP used to encode the current picture. In some examples, if an intra picture encoding mode is active for the current picture, the ALF activation and set selection circuitry 410 (e.g., at block 430) enables chroma adaptive loop filtering for the current picture if the collection of available chroma ALF filter sets is not empty regardless of the current picture's location within the coding GOP and its QP. In some such examples, the most recently (or latest) derived chroma ALF filter set in the collection of available ALF filter sets may be selected by the ALF activation and set selection circuitry 410 for the current picture (e.g., at block 435).

However, if an inter picture encoding mode is active for the current picture, and the collection of available chroma ALF filter sets is not empty, the ALF activation and set selection circuitry 410 limits activation of chroma ALF filtering to specific target picture frames based on the encoding structure (e.g., the coding GOP) and the picture level quantization parameters (e.g., at block 430). In some examples, the frequency of the target frames in the encoding structure (e.g., the coding GOP) depends on the quantization parameter such that for smaller QP (e.g., QP less than, or less than or equal to, a first chroma QP threshold), more target frames are selected for enabling chroma adaptive loop filtering, whereas for larger QP (e.g., QP less than, or less than or equal to, a larger second chroma QP threshold, but greater than the first chroma QP threshold), fewer target frames are selected for enabling chroma adaptive loop filtering.

Figure 5:
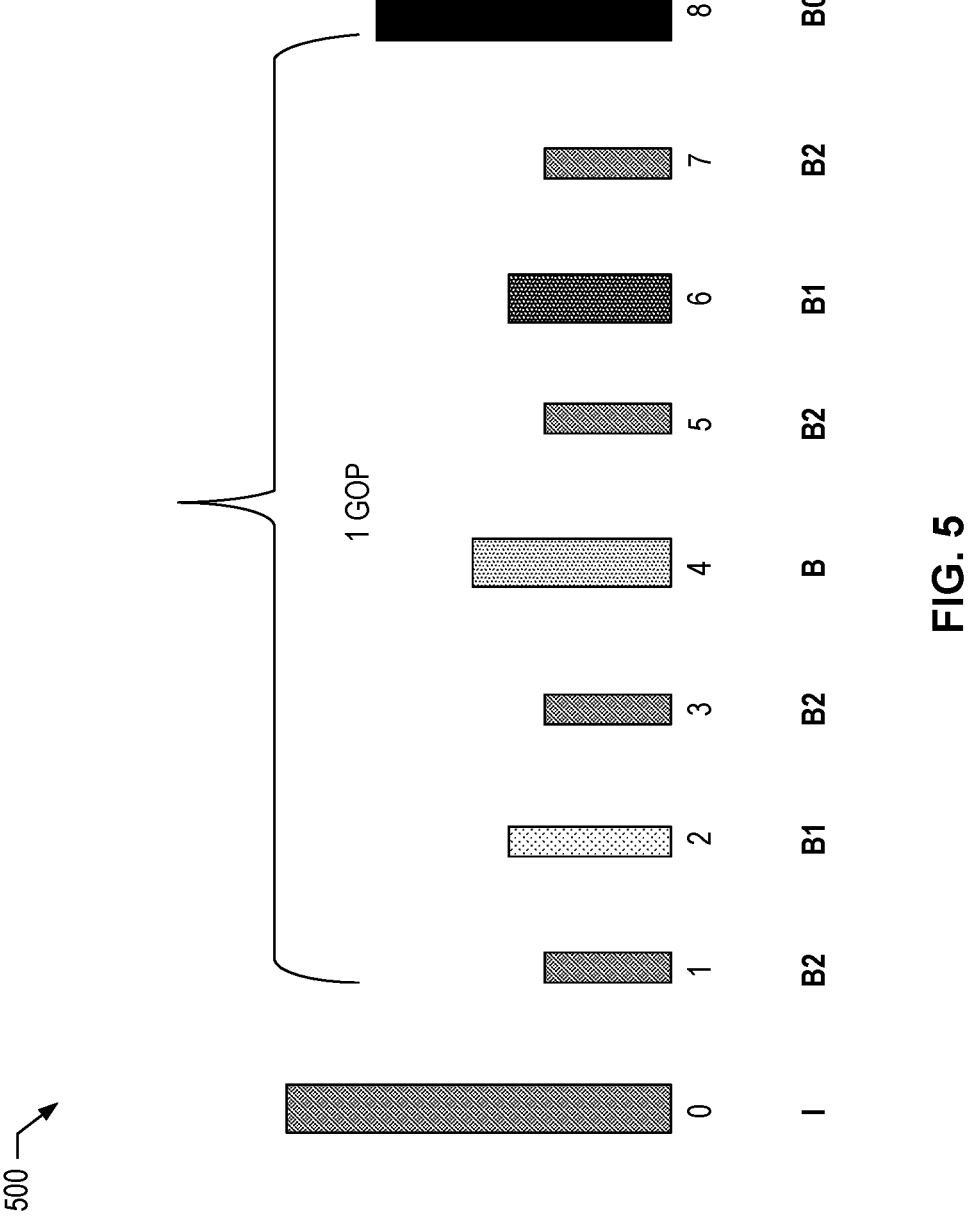
FIG. 5 illustrates an example coding group of pictures used to perform adaptive loop filter selection in the example video encoders of FIGS. 1 and 3.

For example, FIG. 5 illustrates an example coding GOP 500 for which the ALF activation and set selection circuitry 410 can select target frames for chroma adaptive loop filtering activation. In a first example implementation, if the QP for the current picture is less than (or less than or equal to) the first chroma QP threshold (e.g., corresponding to a QP value of 20 or some other value), the ALF activation and set selection circuitry 410 (e.g., at block 430) selects the B0 and B pictures of the coding GOP 500 as target frames for enabling chroma adaptive loop filtering, which results in chroma adaptive loop filtering potentially being enable for up to every 4 frames. However, if the QP for the current picture is less than (or less than or equal to) the larger second chroma QP threshold (e.g., corresponding to a QP value of 40 or some other value), but greater than the first chroma QP threshold, the ALF activation and set selection circuitry 410 (e.g., at block 430) selects just the B0 pictures of the coding GOP 500 as target frames for enabling chroma adaptive loop filtering, which results in chroma adaptive loop filtering potentially being enable for up to every 8 frames. Otherwise, if the QP for the current picture is greater than (or greater than or equal to) the larger second chroma QP threshold, the ALF activation and set selection circuitry 410 (e.g., at block 430) limits target frames to be picture frames for which the intra picture coding mode is active, scene change frames and one of every two B0 pictures, which results in chroma adaptive loop filtering potentially being enable for up to every 16 frames in inter frame encoding. In a second example implementation, if the QP for the current picture is less than (or less than or equal to) the first chroma QP threshold, the ALF activation and set selection circuitry 410 (e.g., at block 430) selects one of every two pictures as target frames for enabling chroma adaptive loop filtering if inter frame encoding is active, whereas if the QP for the current picture is less than (or less than or equal to) the larger second chroma QP threshold, but greater than the first chroma QP threshold, the ALF activation and set selection circuitry 410 selects one of every four pictures as target frames for enabling chroma adaptive loop filtering if inter frame encoding is active. Otherwise, if the QP for the current picture is greater than (or greater than or equal to) the larger second chroma QP threshold, the ALF activation and set selection circuitry 410 limits target frames to be picture frames for which the intra picture coding mode is active, scene change frames and one of every 8 pictures when inter picture coding mode is active. In the preceding examples, if chroma adaptive loop filtering is enabled for the current picture, the most recently (or latest) derived chroma ALF filter set in the collection of available ALF filter sets may be selected by the ALF activation and set selection circuitry 410 for the current picture (e.g., at block 435).

In the illustrated example of FIG. 4, the ALF activation and set selection circuitry 410 implements cross-channel adaptive loop filtering activation (e.g., at block 445) and filter set selection (e.g., at block 450) using the same or similar algorithms as described above for chroma adaptive loop filtering activation and filter set selection. In some examples, the difference between the algorithms implemented by the ALF activation and set selection circuitry 410 for chroma vs cross-channel adaptive loop filtering activation and filter set selection lie in the frequency of the target frame selection when inter-frame encoding is active. For example, with reference to the coding GOP 500 of FIG. 5, the ALF activation and set selection circuitry 410 (e.g., at block 445) can select one of every two frames in the coding GOP 500 (e.g., such as the B0, B and B1 frames) to be target frames for activating cross-channel adaptive loop filtering when inter-frame encoding is example.

In some examples, the ALF selection circuitry 125 includes means for evaluating an ALF buffer associated with an input picture to be encoded. For example, the means for evaluating may be implemented by the example ALF buffer evaluation circuitry 405. In some examples, the example ALF buffer evaluation circuitry 405 may be instantiated by processor circuitry such as the example processor circuitry 1312 of FIG. 13. For instance, the ALF buffer evaluation circuitry 405 may be instantiated by the example microprocessor 1400 of FIG. 14 executing machine executable instructions such as those implemented by at least blocks 705, 710, 725, 730, 745 and 750 of FIG. 7. In some examples, the ALF buffer evaluation circuitry 405 may be instantiated by hardware logic circuitry, which may be implemented by an ASIC, XPU, or the FPGA circuitry 1500 of FIG. 15 structured to perform operations corresponding to the machine readable instructions. Additionally or alternatively, the ALF buffer evaluation circuitry 405 may be instantiated by any other combination of hardware, software, and/or firmware. For example, the ALF buffer evaluation circuitry 405 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the ALF selection circuitry 125 includes means for performing luma, chroma and/or cross-channel ALF activation and filter set selection. For example, the means for performing ALF activation and filter set selection may be implemented by the example ALF activation and set selection circuitry 410. In some examples, the example ALF activation and set selection circuitry 410 may be instantiated by processor circuitry such as the example processor circuitry 1312 of FIG. 13. For instance, the ALF activation and set selection circuitry 410 may be instantiated by the example microprocessor 1400 of FIG. 14 executing machine executable instructions such as those implemented by at least blocks 720, 740 and 760 of FIG. 7, and corresponding blocks of FIGS. 8-10. In some examples, the ALF activation and set selection circuitry 410 may be instantiated by hardware logic circuitry, which may be implemented by an ASIC, XPU, or the FPGA circuitry 1500 of FIG. 15 structured to perform operations corresponding to the machine readable instructions. Additionally or alternatively, the ALF activation and set selection circuitry 410 may be instantiated by any other combination of hardware, software, and/or firmware. For example, the ALF activation and set selection circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 6:
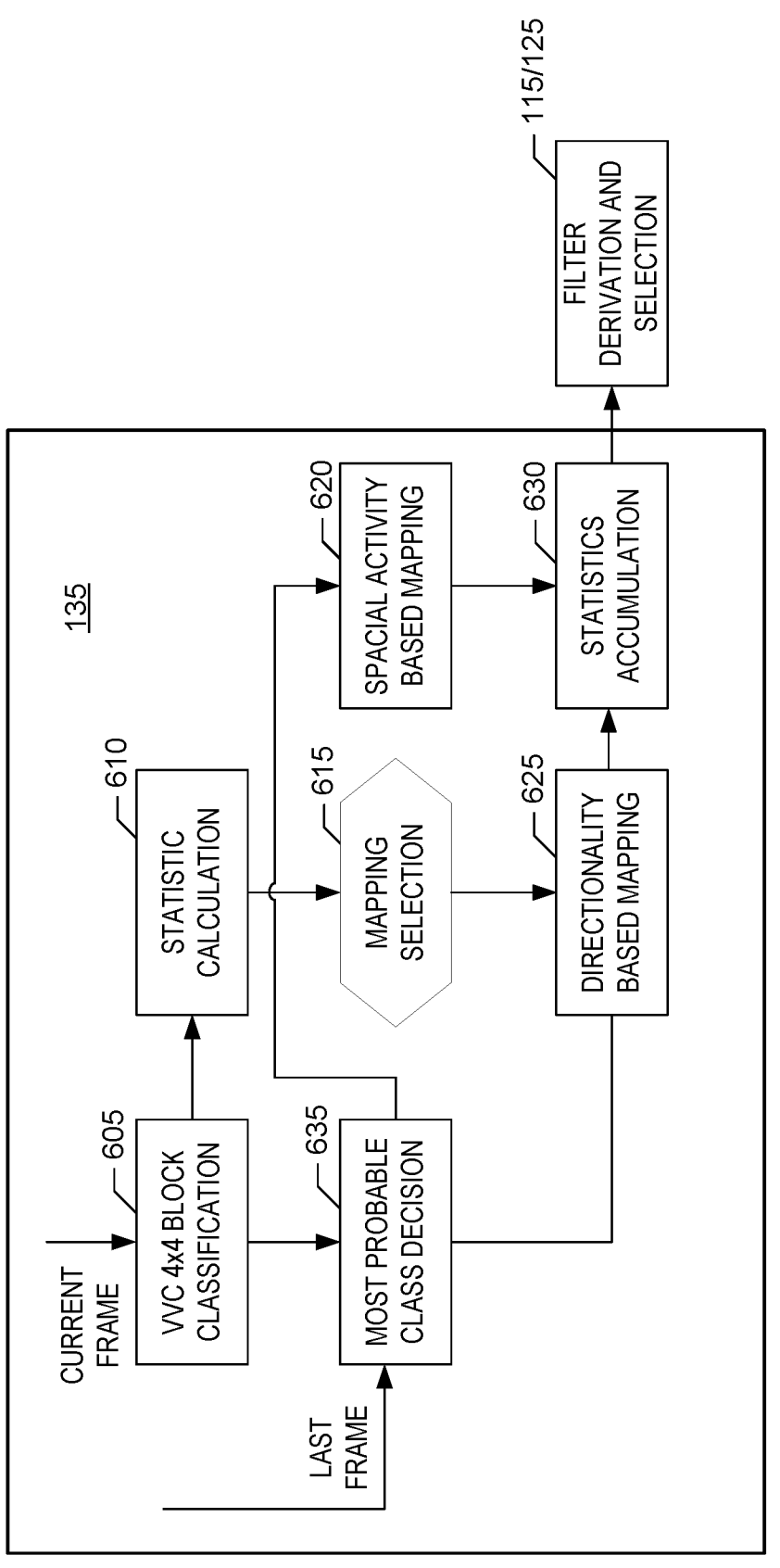
FIG. 6 is a block diagram illustrating an example implementation of the adaptive loop filter classification functionality included in the example video encoder of FIG. 1.

FIG. 6 illustrates an example implementation of the ALF classification circuitry 135 included in the video encoder 105 of FIG. 1. The example ALF classification circuitry 135 of FIG. 6 may be instantiated (e.g., creating an instance of, bring into being for any length of time, materialize, implement, etc.) by processor circuitry such as a central processing unit executing instructions. Additionally or alternatively, the ALF classification circuitry 135 of FIG. 6 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

In the illustrated example of FIG. 6, during the video encoding process, the ALF classification circuitry 135 begins by dividing/segmenting the current input picture into 4×4 sub-blocks and applying 4×4 block classification to classify each of the 4×4 sub-blocks into one of the possible 25 classes defined under the VVC standard (block 605). The ALF classification circuitry 135 also calculates and stores the class statistics for each 4×4 sub-block (block 610). To support derivation of a new ALF filter set for the current input picture (e.g., by the ALF derivation circuitry 115) and to support picture/CTU level ALF filter set selection (e.g., by the ALF selection circuitry 125), the ALF classification circuitry 135 accumulates the 4×4 block statistics for each class over each CTU, and over the entire picture. However, rather than generating the accumulated statistics for every one of the 25 possible classes as in prior VVC encoder, the ALF classification circuitry 135 performs accumulation over a reduced number of classes that are formed by mapping the 25 possible classes to the reduced number of classes before performing the class statistics accumulation.

In the illustrated example of FIG. 6, to perform its classification mapping, the ALF classification circuitry 135 begins with selecting among multiple different mapping algorithms (block 615) that are based on different characteristics of the sub-blocks of the current input picture. In the illustrated example, a first example mapping algorithm is based on the local spatial activity characteristics of the sub-blocks of the current input picture (block 620), and a second example mapping algorithm is based on the local directionality characteristics of the sub-blocks of the current input picture (block 625). After the mapping method is selected (block 615), the classification of each block is mapped to a new class according to the selected mapping algorithm (e.g., block 620 and/or block 625). The ALF classification circuitry 135 then performs class statistics accumulation over just the reduced set of mapped classes (block 630). Subsequently, filter derivation and selection are based on the reduced set of mapped classes rather than the entire set of 25 possible classes.

In some examples, for an initial input picture of a video sequence to be encoded, either the activity-based mapping algorithm (block 620) or the directionality-based mapping algorithm (block 620) is selected by the ALF classification circuitry 135 to accumulate the class statistics for that input picture. Then, for subsequent input pictures of the video sequence, the most frequent class identified for the 4×4 sub-blocks of a prior picture is also included in the reduced set of mapped classes for the next picture to be encoded. In some such examples, the most frequent class for a given picture is determined by the ALF classification circuitry 135 (block 635) based on the 4×4 sub-block classifications of the picture before the ALF classification circuitry 135 applies its mapping algorithm(s) to determine the reduced set of mapped classes for that input picture. The most frequent class for an input picture is the one of the 25 possible classes into which most of the 4×4 sub-blocks of that picture were classified, which is also referred to herein as the most probable class for that input picture. As disclosed in further detail below, in some examples, the activity-based mapping algorithm and/or the directionality-based mapping algorithm can be modified to generate a reduced set of mapped classes that also includes the most frequent class determined for the preceding input picture.

Examining the classification mapping performed by the example ALF classification circuitry 135 of FIG. 6 in further detail, in accordance with the VVC standard, a classification index C is derived by the ALF classification circuitry 135 (e.g., at block 605) for each 4×4 sub-block of a current input picture based on its directionality value D and a quantized value of spatial activity Â according to the equation C=5D+Â, where D and Â are in the range of [0, 4]. As noted above, there are a total of 25 possible classes and, thus, C has values in the range of [0, 24] that correspond respectively to the 25 different possible classes.

In an example implementation of the activity-based mapping algorithm (block 620), the ALF classification circuitry 135 performs classification mapping based on the block spatial activities A to reduce the total of 25 possible classes to a reduced set of mapped classes. For example, the activity-based mapping algorithm (block 620) can map the 25 total possible classes to a reduced set of 5 mapped classes by mapping the possible classes with classification index C={n, n+5, n+10, n+15, n+20} to the same class for each n, where n is one of {0, 1, 2, 3, 4}. As the result, the classes {n, n+5, n+10, n+15, n+20} that are mapped together based on their common spatial activity Â=n for a given n in the set {0, 1, 2, 3, 4} share the same filter and their value is the same in APS syntax alf_luma_coeff_delta_idx[class] (see Table 4). In some examples, the activity-based mapping algorithm implemented by the ALF classification circuitry 135 (block 620) can further reduce the set of mapped classed by further combining mapped classes. For example, the 25 classes can be mapped to 5 classes based on spatial activity Â as described above, and then the classes {n, n+5, n+10, n+15, n+20} with n=3, 4 can be further mapped to the same class to yield reduced set of 4 mapped classes.

In an example implementation of the directionality-based mapping algorithm (block 625), the ALF classification circuitry 135 performs classification mapping based on the block directionality D to reduce the total of 25 possible classes to a reduced set of mapped classes. For example, the directionality-based mapping algorithm (block 625) can map the 25 total possible classes to a reduced set of 5 mapped classes by mapping the possible classes with classification index C={n, n+1, n+2, n+3, n+4} to the same class for each n, where n is one of {0, 1, 2, 3, 4}. As the result, the classes {n, n+1, n+2, n+3, n+4} that are mapped together based on their common directionality D=n for a given n in set {0, 1, 2, 3, 4} share the same filter and their value is the same in APS syntax alf_luma_coeff_delta_idx[class] (see Table 4). In some examples, the directionality-based mapping algorithm implemented by the ALF classification circuitry 135 (block 625) can further reduce the set of mapped classed by further combining mapped classes. For example, the 25 classes can be mapped to 5 classes based on directionality D as described above, and then classes {n, n+1, n+2, n+3, n+4} with n=3, 4 can be further mapped to the same class to yield reduced set of 4 mapped classes.

In some examples, the ALF classification circuitry 135 performs classification mapping based on the activity-based mapping algorithm (block 620) or the directionality-based mapping algorithm (block 625) disclosed above in combination with a mapping based on the most frequent class determined for the previously encoded frame. In some such examples, for the current frame being encoded, if the ALF classification circuitry 135 classifies a sub-block into the same class as the frequent classes of the previously encoded frame, then no further mapping of that class is performed. Otherwise, either the activity-based mapping algorithm (block 620) or the directionality-based mapping algorithm (block 625) is applied, as described above. Thus, in such an example implementation, the set of 25 possible classes is mapped to a reduced set of 6 mapped classes, which includes the most frequent class from the previous frame and the 5 mapped classes determined as described above. If the most probable class is equal to any of the 5 mapped classes, the total number of mapped classes corresponds to just the 5 mapped classes as described above. In another example implementation, the most frequency class from the previous picture is used to replace one of the mapped classes from the activity-based mapping algorithm (block 620) or the directionality-based mapping algorithm (block 625).

Using the classification mapping disclosed above, the number of classes for a given input picture are determined before the filter derivation process to reduce memory utilization. In doing so, not only is memory utilization reduced, but filter derivation is simplified due to the reduced set of class statistics to be processed.

In some examples, the ALF classification circuitry 135 implements means for performing block classification for derivation of an adaptive loop filter set associated with an input picture of a video to be encoded. In some examples, the example ALF classification circuitry 135 may be instantiated by processor circuitry such as the example processor circuitry 1312 of FIG. 13. For instance, the ALF classification circuitry 135 may be instantiated by the example microprocessor 1400 of FIG. 14 executing machine executable instructions such as those implemented by at least FIGS. 11-12. In some examples, the ALF classification circuitry 135 may be instantiated by hardware logic circuitry, which may be implemented by an ASIC, XPU, or the FPGA circuitry 1500 of FIG. 15 structured to perform operations corresponding to the machine readable instructions. Additionally or alternatively, the ALF classification circuitry 135 may be instantiated by any other combination of hardware, software, and/or firmware. For example, the ALF classification circuitry 135 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While example manners of implementing the example video coding system 100 are illustrated in FIGS. 1-6, one or more of the elements, processes, and/or devices illustrated in FIGS. 1-6 may be combined, divided, re-arranged, omitted, eliminated, and/or implemented in any other way. Further, the example video encoder 105, the example video decoder 110, the example ALF derivation circuitry 115, the example ALF buffer 120, the example ALF selection circuitry 125, the example ALF encoding circuitry 130, the example ALF classification circuitry 135, the example ALF circuitry 140, the example luma ALF 145, the example chroma ALF 150, the example cross-channel ALF 155, the example ALF buffer evaluation circuitry 405, the example ALF activation and set selection circuitry 410 and/or, more generally, the example video coding system 100 of FIGS. 1-6, may be implemented by hardware alone or by hardware in combination with software and/or firmware. Thus, for example, any of the example video encoder 105, the example video decoder 110, the example ALF derivation circuitry 115, the example ALF buffer 120, the example ALF selection circuitry 125, the example ALF encoding circuitry 130, the example ALF classification circuitry 135, the example ALF circuitry 140, the example luma ALF 145, the example chroma ALF 150, the example cross-channel ALF 155, the example ALF buffer evaluation circuitry 405, the example ALF activation and set selection circuitry 410 and/or, more generally, the example video coding system 100 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video coding system 100 may include one or more elements, processes, and/or devices in addition to, or instead of, those illustrated in FIGS. 1-6, and/or may include more than one of any or all of the illustrated elements, processes and devices.

Flowcharts representative of example machine readable instructions, which may be executed to configure processor circuitry to implement the example video encoder 105 of FIGS. 1-6, are shown in FIGS. 7-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program(s) or portions thereof may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 7-12, many other methods of implementing the example video encoder 105 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
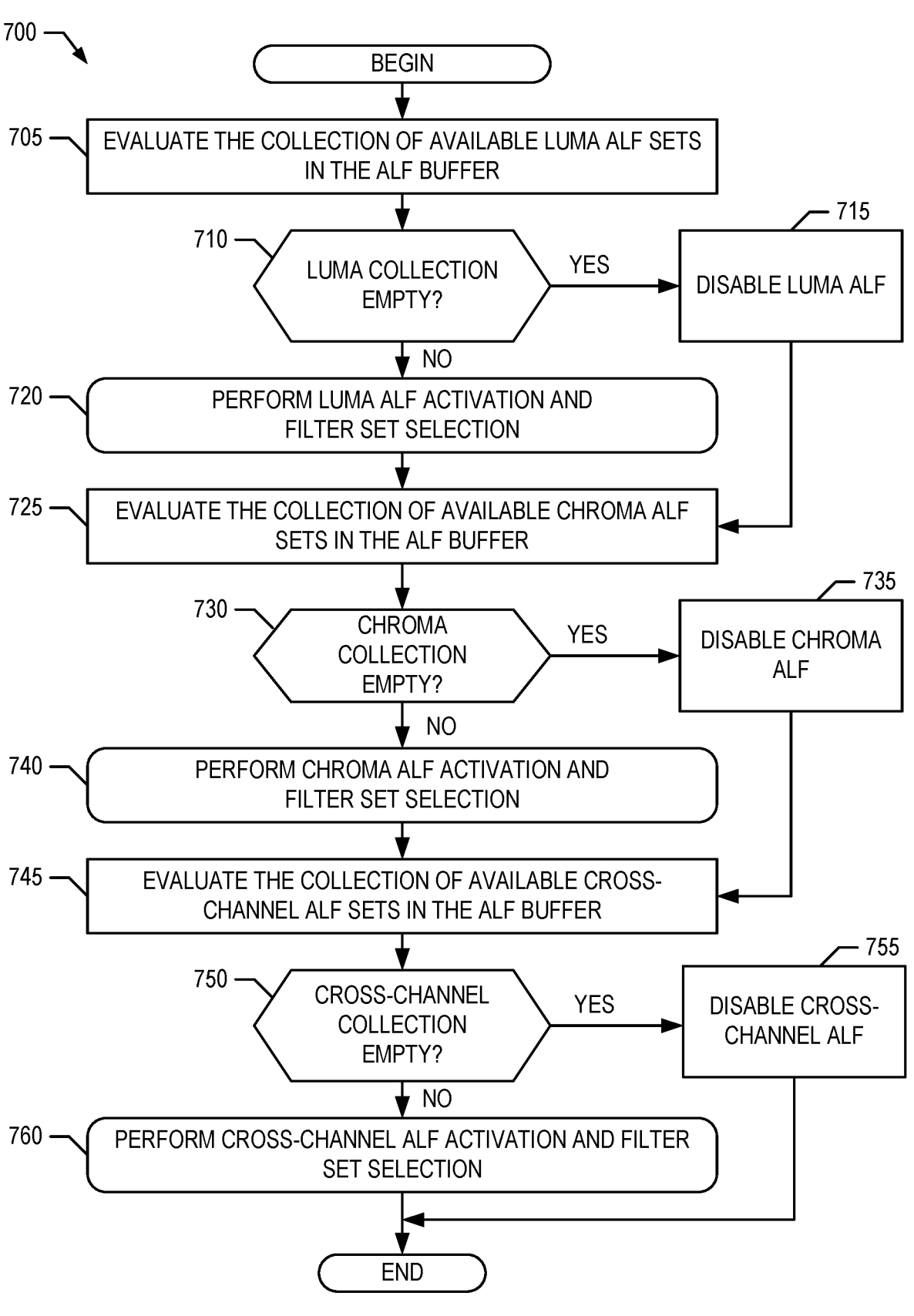

FIG. 7 is a flowchart representative of example machine readable instructions and/or example operations 700 that may be executed and/or instantiated by processor circuitry to implement ALF filter set selection in the example video encoder 105. With reference to the preceding figures and associated written descriptions, the machine readable instructions and/or the operations 700 of FIG. 7 begin at block 705, at which the example ALF buffer evaluation circuitry 405 included in the example ALF selection circuitry 125 of the video encoder 105 evaluates the collection of available luma ALF filter sets stored in the ALF buffer 120 for the current input picture, as described above. At block 710, the ALF buffer evaluation circuitry 405 determines whether the collection of available luma ALF filter sets is empty. If the collection of available luma ALF filter sets is empty (e.g., the "Yes" branch of block 710), at block 715 the example ALF activation and set selection circuitry 410 included in the ALF selection circuitry 125 of the video encoder 105 disables luma adaptive loop filtering associated with the current input picture. However, if the collection of available luma ALF filter sets is not empty (e.g., the "No" branch of block 710), at block 720 the ALF activation and set selection circuitry 410 performs luma ALF activation and filter set selection, as described above. Example machine readable instructions and/or the operations to perform the processing at block 720 are illustrated in FIG. 8, which is described in further detail below.

At block 725, the ALF buffer evaluation circuitry 405 of the video encoder 105 evaluates the collection of available chroma ALF filter sets stored in the ALF buffer 120 for the current input picture, as described above. At block 730, the ALF buffer evaluation circuitry 405 of the video encoder 105 determines whether the collection of available chroma ALF filter sets is empty. If the collection of available chroma ALF filter sets is empty (e.g., the "Yes" branch of block 730), at block 735 the ALF activation and set selection circuitry 410 of the video encoder 105 disables chroma adaptive loop filtering associated with the current input picture. However, if the collection of available chroma ALF filter sets is not empty (e.g., the "No" branch of block 730), at block 740 the ALF activation and set selection circuitry 410 performs chroma ALF activation and filter set selection, as described above. Example machine readable instructions and/or the operations to perform the processing at block 740 are illustrated in FIG. 9, which is described in further detail below.

At block 745, the ALF buffer evaluation circuitry 405 of the video encoder 105 evaluates the collection of available cross-channel ALF filter sets stored in the ALF buffer 120 for the current input picture, as described above. At block 750, the ALF buffer evaluation circuitry 405 of the video encoder 105 determines whether the collection of available cross-channel ALF filter sets is empty. If the collection of available cross-channel ALF filter sets is empty (e.g., the "Yes" branch of block 750), at block 755 the ALF activation and set selection circuitry 410 of the video encoder 105 disables cross-channel adaptive loop filtering associated with the current input picture. However, if the collection of available cross-channel ALF filter sets is not empty (e.g., the "No" branch of block 750), at block 760 the ALF activation and set selection circuitry 410 performs cross-channel ALF activation and filter set selection, as described above. Example machine readable instructions and/or the operations to perform the processing at block 760 are illustrated in FIG. 10, which is described in further detail below.

Figure 8:
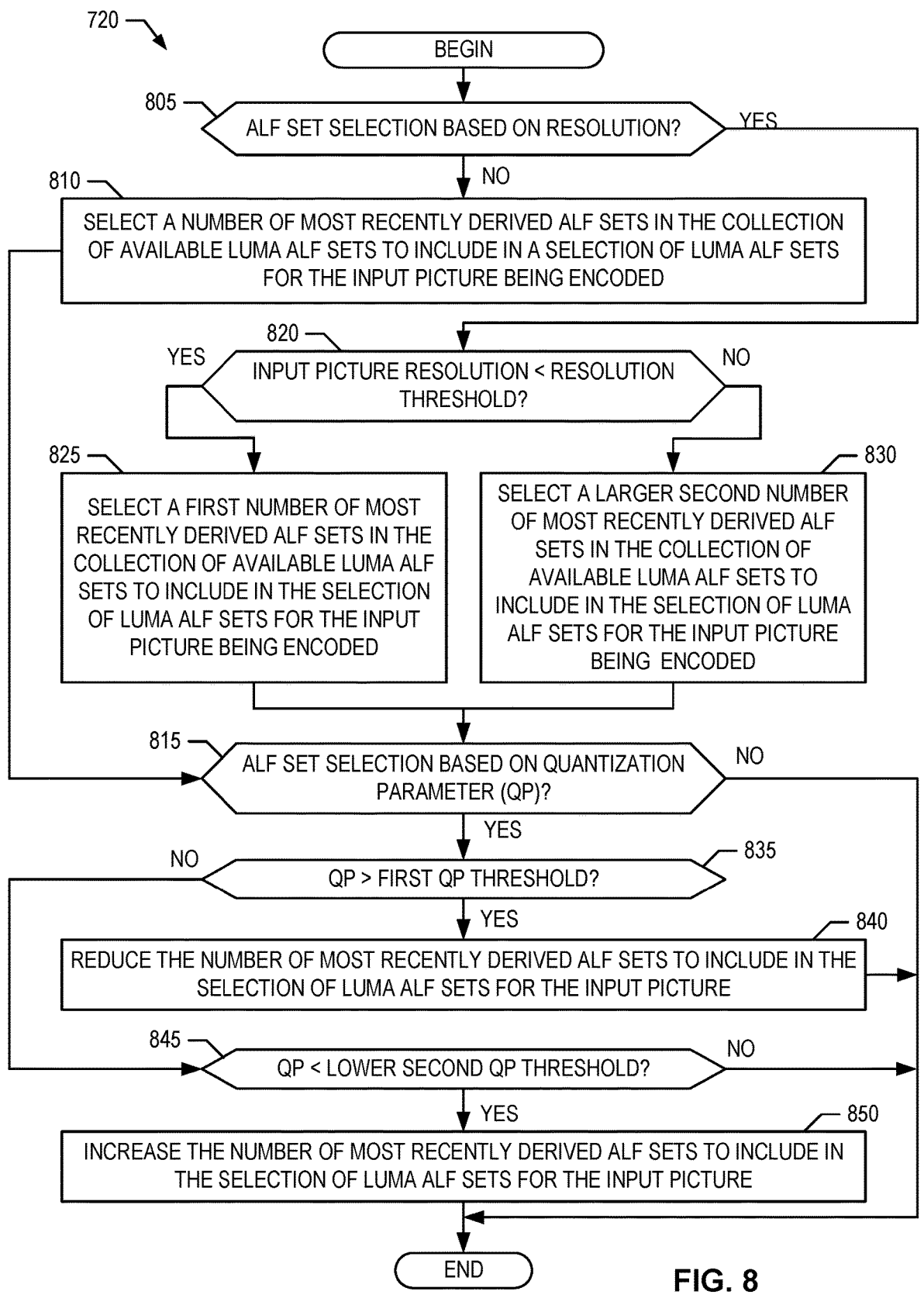

FIG. 8 is a flowchart representative of example machine readable instructions and/or example operations 720 that may be executed and/or instantiated by processor circuitry to implement luma ALF activation and filter set selection in the example video encoder 105. The machine readable instructions and/or the operations 720 of FIG. 8 may be used to implement the processing at block 720 of FIG. 7. With reference to the preceding figures and associated written descriptions, the machine readable instructions and/or the operations 720 of FIG. 8 begin at block 805, at which the example ALF activation and set selection circuitry 410 included in the example ALF selection circuitry 125 of the video encoder 105 determines whether luma ALF filter selection based on video resolution is enabled. If luma ALF filter selection based on video resolution is not enabled (e.g., the "No" branch of block 805), at block 810 the ALF activation and set selection circuitry 410 selects a number (e.g., 1 or some other number) of the most recently derives luma ALF filter sets in the collection of available luma ALF filter sets to include in the selection of luma ALF filters for the current input picture being encoded, as described above. Processing then proceeds to block 815.

However, if luma ALF filter selection based on video resolution is enabled (e.g., the "Yes" branch of block 805), at block 820 the ALF activation and set selection circuitry 410 determines whether the resolution of the current input picture is less than a resolution threshold. If the resolution of the current input picture is less than the resolution threshold (e.g., the "Yes" branch of block 820), at block 825 the ALF activation and set selection circuitry 410 selects a first number (e.g., 1 or some other number) of the most recently derived luma ALF filter sets in the collection of available luma ALF filter sets to include in the selection of luma ALF filters for the current input picture being encoded, as described above. Processing then proceeds to block 815. However, if the resolution of the current input picture is not less than the resolution threshold (e.g., the "No" branch of block 820), at block 830 the ALF activation and set selection circuitry 410 selects a larger second number (e.g., 2 or some other number) of the most recently derived luma ALF filter sets in the collection of available luma ALF filter sets to include in the selection of luma ALF filters for the current input picture being encoded, as described above. Processing then proceeds to block 815.

At block 815, the ALF activation and set selection circuitry 410 determines whether luma ALF filter selection based on the QP of the current input picture is enabled. If luma ALF filter selection based on QP is not enabled (e.g., the "No" branch of block 815), the machine readable instructions and/or the operations 720 end. However, if luma ALF filter selection based on QP is enabled (e.g., the "Yes" branch of block 815), at block 835 the ALF activation and set selection circuitry 410 determines whether the QP of the current input picture is greater than a first QP threshold. If the QP of the current input picture is greater than a first QP threshold (e.g., the "Yes" branch of block 835), at block 840 the ALF activation and set selection circuitry 410 reduces the number of the most recently derived luma ALF filter sets to include in the selection of luma ALF filters for the current input picture being encoded by 1 (or some other number). The machine readable instructions and/or the operations 720 then end. However, if the QP of the current input picture is not greater than the first QP threshold (e.g., the "No" branch of block 835), at block 845 the ALF activation and set selection circuitry 410 determines whether the QP of the current input picture is less than a lower second QP threshold. If the QP of the current input picture is less than the second QP threshold (e.g., the "Yes" branch of block 845), at block 850 the ALF activation and set selection circuitry 410 increases the number of the most recently derived luma ALF filter sets to include in the selection of luma ALF filters for the current input picture being encoded by 1 (or some other number). The machine readable instructions and/or the operations 720 then end.

FIG. 9 is a flowchart representative of example machine readable instructions and/or example operations 740 that may be executed and/or instantiated by processor circuitry to implement chroma ALF activation and filter set selection in the example video encoder 105. The machine readable instructions and/or the operations 740 of FIG. 9 may be used to implement the processing at block 740 of FIG. 7. With reference to the preceding figures and associated written descriptions, the machine readable instructions and/or the operations 740 of FIG. 9 begin at block 905, at which the example ALF activation and set selection circuitry 410 included in the example ALF selection circuitry 125 of the video encoder 105 determines whether an intra picture encode mode is active for the current input picture being encoded. If the intra picture encode mode is active for the current input picture (e.g., the "Yes" branch of block 905), at block 910 the ALF activation and set selection circuitry 410 enables chroma adaptive loop filtering for the current input picture, as described above. Processing then proceeds to block 915.

However, if the intra picture encode mode is not active for the current input picture (e.g., the "No" branch of block 905), then the inter-frame encoding mode is active for the current input picture, and at block 920 the ALF activation and set selection circuitry 410 identifies target picture frame locations for which chroma adaptive loop filtering is to be enabled in the coding GOP including the current input picture. As described above, the ALF activation and set selection circuitry 410 identifies the target picture frame locations based on the QP for the current picture. At block 925, the ALF activation and set selection circuitry 410 determines whether the current input picture corresponds to one of the target coding GOP frames for which chroma adaptive loop filtering is to be enabled. If the current input picture corresponds to one of the target coding GOP frames (e.g., the "Yes" branch of block 925), at block 930 the ALF activation and set selection circuitry 410 enables chroma adaptive loop filtering for the current input picture, as described above. Processing then proceeds to block 915. However, if the current input picture does not correspond to one of the target coding GOP frames (e.g., the "No" branch of block 925), at block 935 the ALF activation and set selection circuitry 410 disables chroma adaptive loop filtering for the current input picture, as described above. Processing then proceeds to block 915.

At block 915, the ALF activation and set selection circuitry 410 determines whether chroma adaptive loop filtering has been enabled for the current input picture frame. If chroma adaptive loop filtering has been enabled (e.g., the "Yes" branch of block 915), at block 940 the ALF activation and set selection circuitry 410 selects the most recently derives chroma ALF filter set in the collection of chroma luma ALF filter sets to include in the selection of chroma ALF filters for the current input picture being encoded, as described above. The machine readable instructions and/or the operations 720 then end.

FIG. 10 is a flowchart representative of example machine readable instructions and/or example operations 740 that may be executed and/or instantiated by processor circuitry to implement cross-channel ALF activation and filter set selection in the example video encoder 105. The machine readable instructions and/or the operations 740 of FIG. 10 may be used to implement the processing at block 740 of FIG. 7. With reference to the preceding figures and associated written descriptions, the machine readable instructions and/or the operations 740 of FIG. 10 begin at block 1005, at which the example ALF activation and set selection circuitry 410 included in the example ALF selection circuitry 125 of the video encoder 105 determines whether an intra picture encode mode is active for the current input picture being encoded. If the intra picture encode mode is active for the current input picture (e.g., the "Yes" branch of block 1005), at block 1010 the ALF activation and set selection circuitry 410 enables cross-channel adaptive loop filtering for the current input picture, as described above. Processing then proceeds to block 1015.

However, if the intra picture encode mode is not active for the current input picture (e.g., the "No" branch of block 1005), then the inter-frame encoding mode is active for the current input picture, and at block 1020 the ALF activation and set selection circuitry 410 identifies target picture frame locations for which cross-channel adaptive loop filtering is to be enabled in the coding GOP including the current input picture. As described above, the ALF activation and set selection circuitry 410 identifies the target picture frame locations based on the QP for the current picture. At block 1025, the ALF activation and set selection circuitry 410 determines whether the current input picture corresponds to one of the target coding GOP frames for which cross-channel adaptive loop filtering is to be enabled. If the current input picture corresponds to one of the target coding GOP frames (e.g., the "Yes" branch of block 1025), at block 1030 the ALF activation and set selection circuitry 410 enables cross-channel adaptive loop filtering for the current input picture, as described above. Processing then proceeds to block 1015. However, if the current input picture does not correspond to one of the target coding GOP frames (e.g., the "No" branch of block 1025), at block 1035 the ALF activation and set selection circuitry 410 disables cross-channel adaptive loop filtering for the current input picture, as described above. Processing then proceeds to block 1015.

At block 1015, the ALF activation and set selection circuitry 410 determines whether cross-channel adaptive loop filtering has been enabled for the current input picture frame. If cross-channel adaptive loop filtering has been enabled (e.g., the "Yes" branch of block 1015), at block 1040 the ALF activation and set selection circuitry 410 selects the most recently derives cross-channel ALF filter set in the collection of cross-channel luma ALF filter sets to include in the selection of cross-channel ALF filters for the current input picture being encoded, as described above. The machine readable instructions and/or the operations 740 then end.

Figure 11:
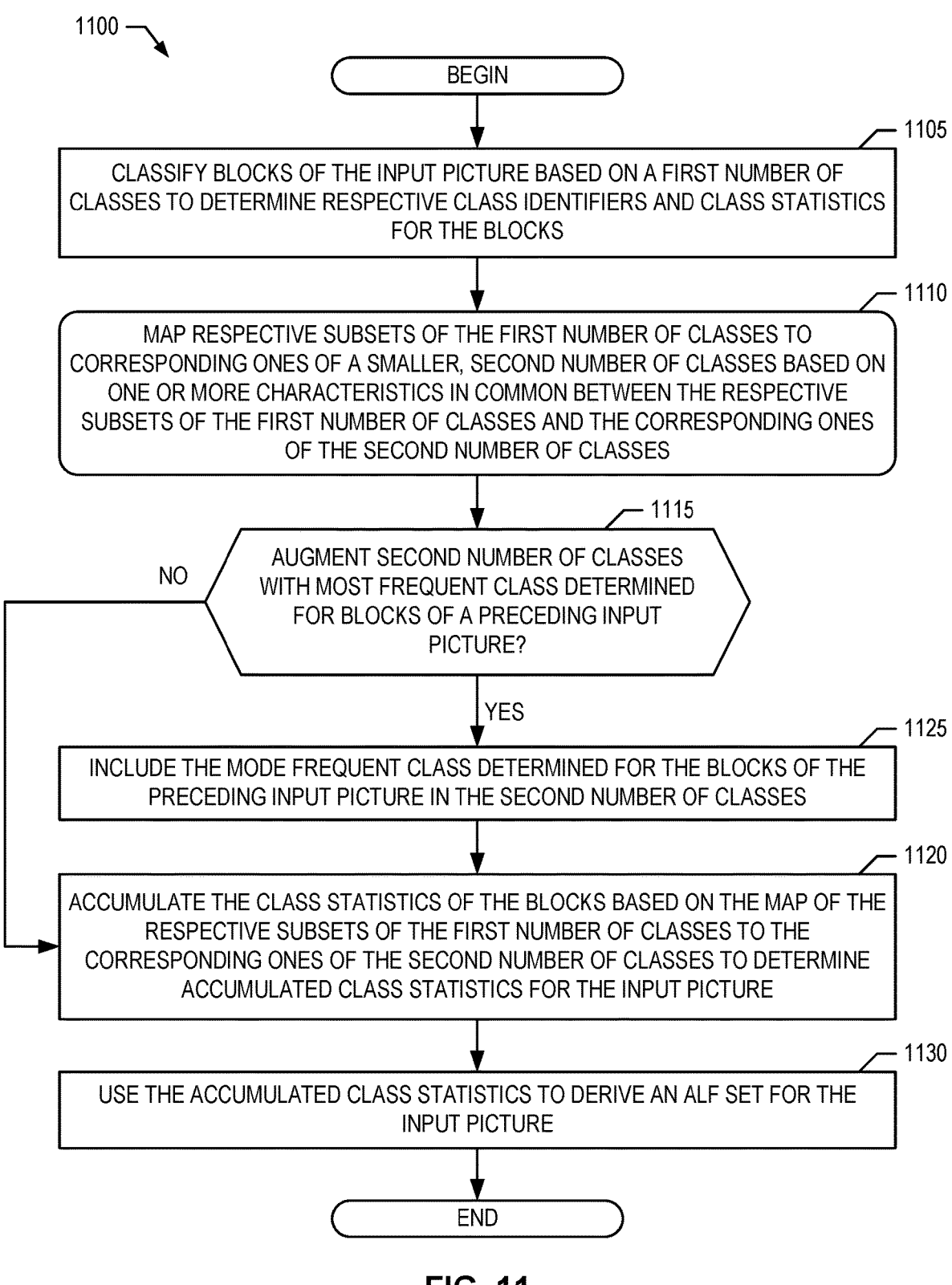
FIGS. 11-12 are flowcharts representative of example machine readable instructions and/or example operations that may be executed by example processor circuitry to implement the adaptive loop filter classification functionality included in the example video encoders of FIGS. 1 and/or 6.

FIG. 11 is a flowchart representative of example machine readable instructions and/or example operations 1100 that may be executed and/or instantiated by processor circuitry to implement ALF filter classification in the example video encoder 105. With reference to the preceding figures and associated written descriptions, the machine readable instructions and/or the operations 1100 of FIG. 11 begin at block 1105, at which the example ALF classification circuitry 135 included in the video encoder 105 divides the current input picture into 4×4 sub-blocks and classifies the 4×4 sub-blocks based on a first number of possible classes (e.g., 25 possible classes) to determine respective class identifiers (e.g., C described above) and class statistics for the respective sub-blocks, as described above. At block 1110, the ALF classification circuitry 135 maps respective subsets of the first number of classes to corresponding classes in a smaller, second number of classes, as described above. As further described above, the mapping performed at block 1110 is based on one or more characteristics (e.g., such as spatial activity and/or directionality characteristics) in common between the respective subsets of the first number of classes and the corresponding ones of the second number of classes. Example machine readable instructions and/or the operations that may be used to implement the processing at block 1110 are illustrated in FIG. 12, which is described in further detail below.

At block 1115, the ALF classification circuitry 135 determines whether the reduced second number of mapped classes is to be augments with another class corresponding to the most frequent class determined for a preceding input picture. If the reduced second number of mapped classes is not to be augmented with the most frequent class determined for the preceding input picture (e.g., the "No" branch of block 1115), processing proceeds to block 1120. However, if the reduced second number of mapped classes is to be augmented with the most frequent class determined for the preceding input picture (e.g., the "Yes" branch of block 1115), at block 1125 the ALF classification circuitry 135 includes the most frequent class determined for the preceding input picture in the reduced second number of mapped classes for the current input picture, as described above.

At block 1120, the ALF classification circuitry 135 accumulates the class statistics of the sub-blocks in the current input picture based on the mapping of the respective subsets of the first number of classes to corresponding ones of the reduced second number classes to determine accumulated class statistics for the current input picture, as described above. At block 1130, the ALF classification circuitry 135 provides the accumulated class statistics for the current input picture to the example ALF derivation circuitry 115 and the example ALF selection circuitry 125 of the video encoder 105 for using in determining the ALF filter set(s) for the current input picture, as described above. The machine readable instructions and/or the operations 1100 then end.

Figure 12:
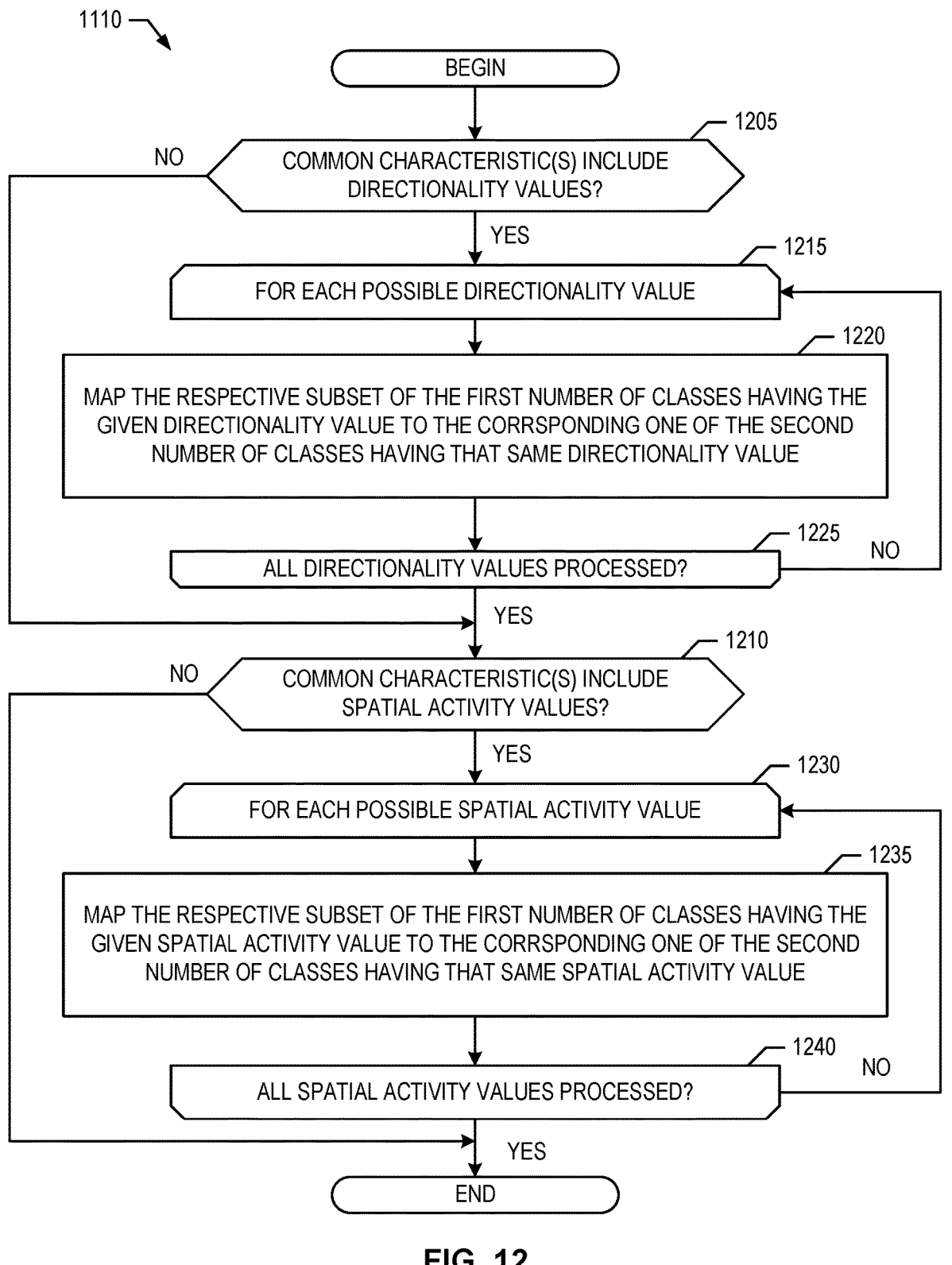

FIG. 12 is a flowchart representative of example machine readable instructions and/or example operations 1110 that may be executed and/or instantiated by processor circuitry to implement block classification mapping in the example video encoder 105. The machine readable instructions and/or the operations 1110 of FIG. 12 may be used to implement the processing at block 1110 of FIG. 11. With reference to the preceding figures and associated written descriptions, the machine readable instructions and/or the operations 1110 of FIG. 12 begin at block 1205, at which the example ALF classification circuitry 135 included in the video encoder 105 determines whether the common sub-block characteristic(s) to be used for classification mapping include directionality values. If the common sub-block characteristic(s) to be used for classification mapping do not include directionality values (e.g., the "No" branch of block 1205), processing proceeds to block 1210. However, if the common sub-block characteristic(s) to be used for classification mapping include directionality values (e.g., the "Yes" branch of block 1205), at block 1215 the ALF classification circuitry 135 begins iterating over the possible directionality values for the sub-blocks of the input image. At block 1220 for a given directionality value, the ALF classification circuitry 135 maps the respective subsets of the first number of classes having that directionality value to the corresponding one of the second number of classes having that same directionality value, as described above. For example, and as described above, at block 1220 the ALF classification circuitry 135 can map, for a given directionality value D=n corresponding to the current iteration, the subset of the first number of classes with classification index C={n, n+1, n+2, n+3, n+4} to a same, new class (e.g., with class identifier n) in the reduced second number of classes that corresponds to that directionality value. At block 1225, the ALF classification circuitry 135 continues iterating until all the possible directionality values have been processed.

At block 1210, the ALF classification circuitry 135 determines whether the common sub-block characteristic(s) to be used for classification mapping include spatial activity values. If the common sub-block characteristic(s) to be used for classification mapping do not include spatial activity values (e.g., the "No" branch of block 1210), the machine readable instructions and/or the operations 1110 end. However, if the common sub-block characteristic(s) to be used for classification mapping include spatial activity values (e.g., the "Yes" branch of block 1210), at block 1230 the ALF classification circuitry 135 begins iterating over the possible spatial activity values for the sub-blocks of the input image. At block 1235 for a given spatial activity value, the ALF classification circuitry 135 maps the respective subsets of the first number of classes having that spatial activity value to the corresponding one of the second number of classes having that same spatial activity value, as described above. For example, and as described above, at block 1235 the ALF classification circuitry 135 can map, for a given spatial activity value D=n corresponding to the current iteration, the subset of the first number of classes with classification index C={n, n+5, n+10, n+15, n+20} to a same, new class (e.g., with class identifier n) in the reduced second number of classes that corresponds to that spatial activity value. At block 1240, the ALF classification circuitry 135 continues iterating until all the possible spatial activity values have been processed. The machine readable instructions and/or the operations 1110 then end.

Figure 13:
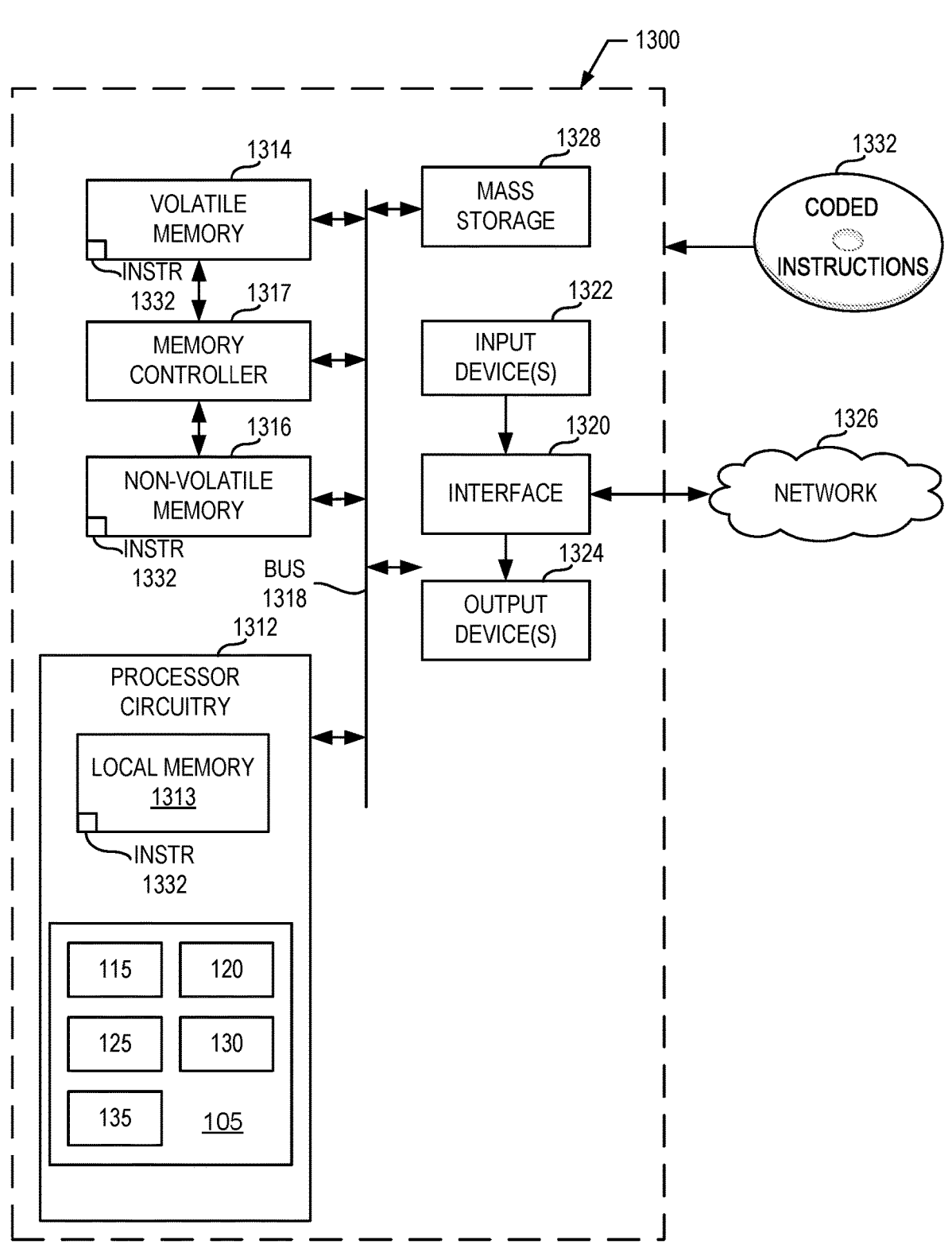
FIG. 13 is a block diagram of an example processing platform including processor circuitry structured to execute the example machine readable instructions and/or the example operations of FIGS. 7-12 to implement the example video encoders of FIGS. 1, 3 and/or 6.

FIG. 13 is a block diagram of an example processor platform 1300 structured to execute and/or instantiate the machine readable instructions and/or the operations of FIGS. 7-12 to implement the example video encoder 105 of FIGS. 1-6. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example video decoder 110, the example ALF derivation circuitry 115, the example ALF buffer 120, the example ALF selection circuitry 125, the example ALF encoding circuitry 130, the example ALF classification circuitry 135, the example ALF circuitry 140, the example luma ALF 145, the example chroma ALF 150, the example cross-channel ALF 155, the example ALF buffer evaluation circuitry 405, the example ALF activation and set selection circuitry 410 and/or, more generally, the example video encoder 105.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1322 are arranged or otherwise configured to allow the user to control the processor platform 1300 and provide data to the processor platform 1300 using physical gestures, such as, but not limited to, hand or body movements, facial expressions, face recognition, etc.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 7-12, may be stored in the mass storage device 1328, in the volatile memory 1314, in the non-volatile memory 1316, and/or on a removable non-transitory computer readable storage medium such as a CD or DVD.

Figure 14:
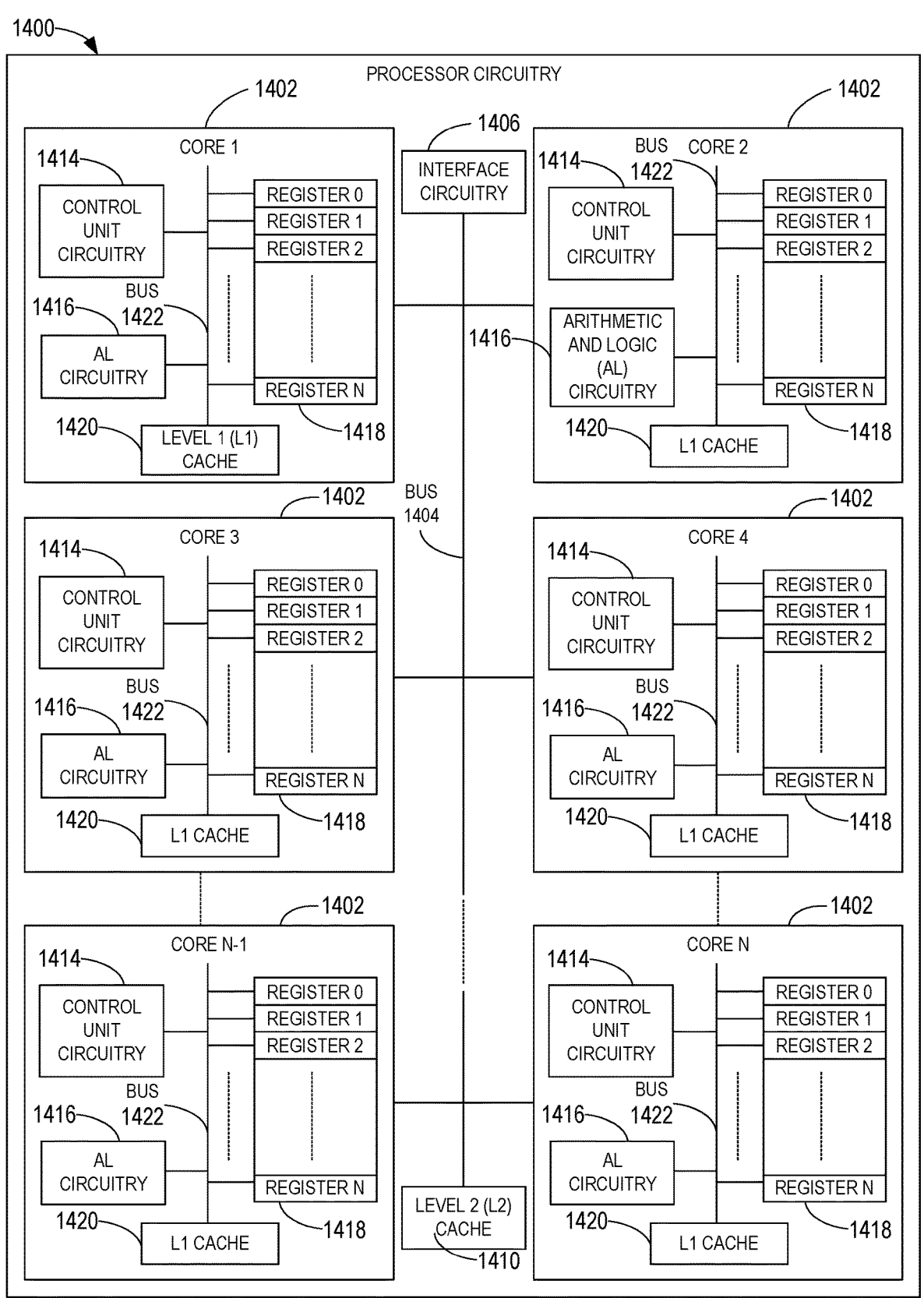
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowchart of FIGS. 7-12 to effectively instantiate the video encoder 105 as logic circuits to perform the operations corresponding to those machine readable instructions. In some such examples, the video encoder 105 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 7-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
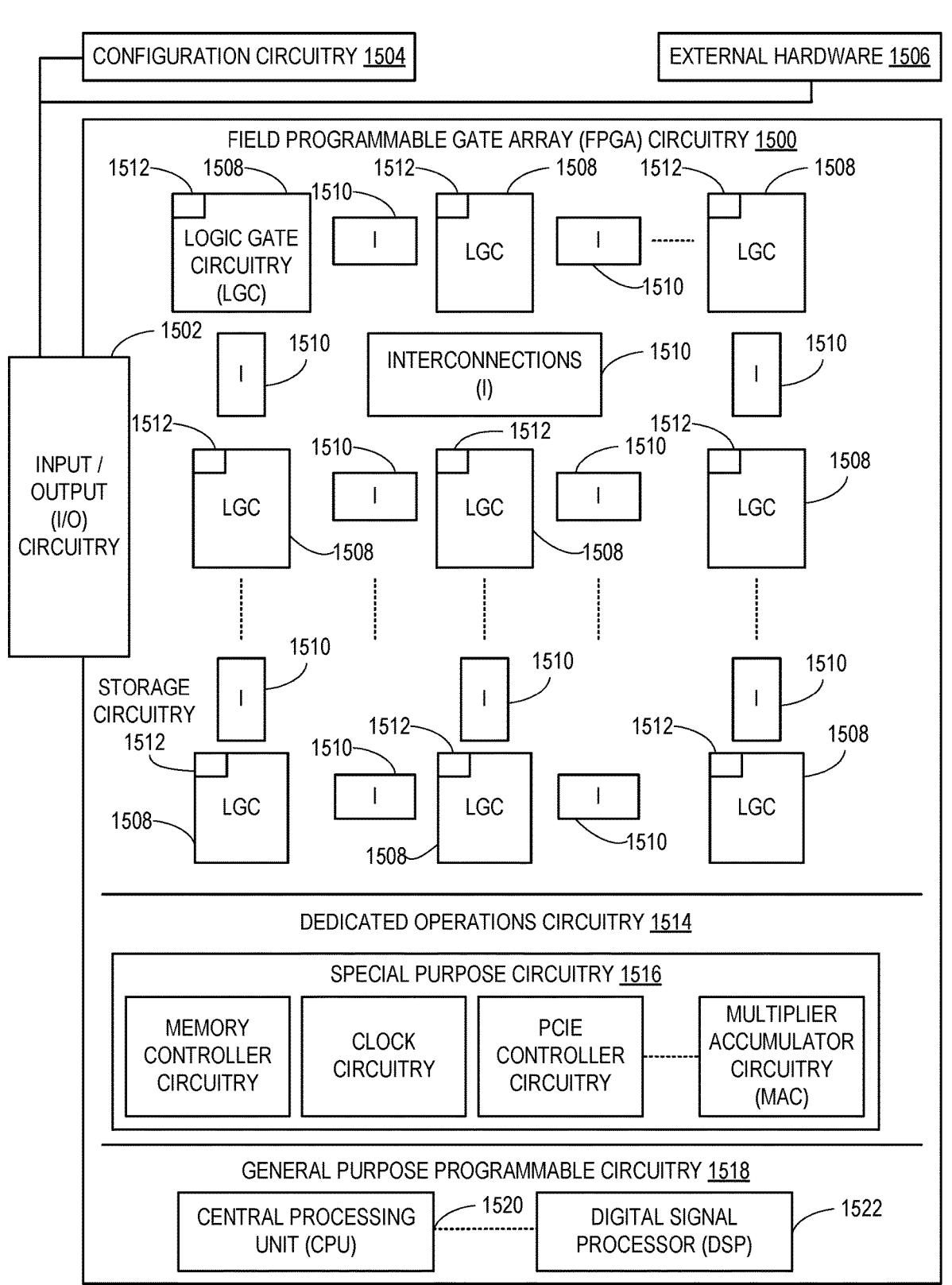
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 7-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 7-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 7-12. As such, the FPGA circuitry 1500 may be structured to effectively instantiate some or all of the machine readable instructions of the flowcharts of FIGS. 7-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 7-12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 7-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowchart of FIGS. 7-12 may be executed by one or more of the cores 1402 of FIG. 14, a second portion of the machine readable instructions represented by the flowchart of FIGS. 7-12 may be executed by the FPGA circuitry 1500 of FIG. 15, and/or a third portion of the machine readable instructions represented by the flowchart of FIGS. 7-12 may be executed by an ASIC. It should be understood that some or all of the video encoder 105 may, thus, be instantiated at the same or different times. Some or all of the circuitry may be instantiated, for example, in one or more threads executing concurrently and/or in series. Moreover, in some examples, some or all of the video encoder 105 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
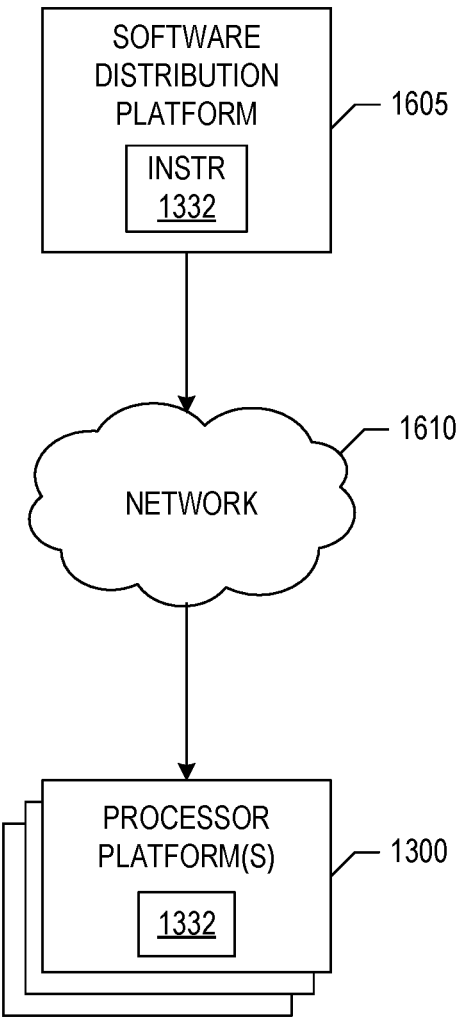
FIG. 16 is a block diagram of an example software distribution platform (e.g., one or more servers) to distribute software (e.g., software corresponding to the example machine readable instructions of FIGS. 7-12) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions of FIGS. 7-12, as described above. The one or more servers of the example software distribution platform 1605 are in communication with an example network 1610, which may correspond to any one or more of the Internet and/or any of the example networks 1332 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions of FIGS. 7-12, may be downloaded to the example processor platform 400, which is to execute the machine readable instructions 1332 to implement the video encoder 105. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that implement adaptive loop filter classification and selection for video coding. Further examples and combinations thereof include the following:

Example 1 includes an apparatus to implement adaptive loop filter selection associated with encoding of an input picture of a video, the apparatus comprising at least one memory, machine readable instructions, and processor circuitry to at least one of instantiate or execute the machine readable instructions to determine whether a collection of available adaptive loop filter sets associated with luma components of the input picture is empty, and in response to the collection of available adaptive loop filter sets not being empty enable adaptive loop filtering for the luma components of the input picture, and select at least one of the collection of available adaptive loop filter sets to include in a selection of adaptive loop filter sets for the input picture, the selection of adaptive loop filter sets to be used to perform adaptive loop filtering of luma components of a decoded picture corresponding to the input picture, the selection based on an order in which ones of the available adaptive loop filter sets in the collection were derived.

Example 2 includes the apparatus of example 1, wherein the ones of the available adaptive loop filter sets in the collection were derived for corresponding pictures of the video that preceded the input picture, and the processor circuitry is to limit the selection of adaptive loop filter sets for the input picture to one most recently derived adaptive loop filter set in the collection of available adaptive loop filter sets.

Example 3 includes the apparatus of example 1 or example 2, wherein the processor circuitry is to select a number of most recently derived adaptive loop filter sets in the collection of available adaptive loop filter sets to include in the selection of adaptive loop filter sets for the input picture, the number to be at least one and less than an upper limit of a size of the collection of available adaptive loop filter sets.

Example 4 includes the apparatus of any one of examples 1 to 3, wherein the number is a first number and the processor circuitry is to select the first number of the most recently derived adaptive loop filter sets in the collection of available adaptive loop filter sets to include in the selection of adaptive loop filter sets for the input picture in response to a resolution of the input picture being less than a threshold, and select a second number of the most recently derived adaptive loop filter sets in the collection of available adaptive loop filter sets to include in the selection of adaptive loop filter sets for the input picture in response to the resolution of the input picture being greater than the threshold, the second number greater than the first number and less than the upper limit of the size of the collection of available adaptive loop filter sets.

Example 5 includes the apparatus of any one of examples 1 to 4, wherein the processor circuitry is to reduce the number of the most recently derived adaptive loop filter sets to include in the selection of adaptive loop filter sets for the input picture in response to a quantization parameter used to encode the input picture being greater than a first threshold, and increase the number of the most recently derived adaptive loop filter sets to include in the selection of adaptive loop filter sets for the input picture in response to the quantization parameter used to encode the input picture being less than a second threshold.

Example 6 includes the apparatus of any one of examples 1 to 5, wherein the second threshold is equal to the first threshold.

Example 7 includes the apparatus of any one of examples 1 to 6, wherein the second threshold is less than the first threshold.

Example 8 includes the apparatus of any one of examples 1 to 7, wherein the processor circuitry is to select the number of most recently derived adaptive loop filter sets in the collection of available adaptive loop filter sets to include in the selection of adaptive loop filter sets for the input picture without performing a multiple pass search over the collection of available adaptive loop filter sets.

Example 9 includes the apparatus of any one of examples 1 to 8, wherein the processor circuitry is to disable adaptive loop filtering associated with the luma components of the input picture in response to the collection of available adaptive loop filter sets being empty.

Example 10 includes the apparatus of any one of examples 1 to 9, wherein the collection of available adaptive loop filter sets is a first collection, and the processor circuitry is to determine whether a second collection of available adaptive loop filter sets associated with chroma components of the input picture is empty, disable adaptive loop filtering associated with the chroma components of the input picture in response to the second collection of available adaptive loop filter sets being empty, and in response to the second collection of available adaptive loop filter sets not being empty, determine whether to enable adaptive loop filtering associated with the chroma components of the input picture based on an encoding mode for the input picture.

Example 11 includes the apparatus of any one of examples 1 to 10, wherein the processor circuitry is to enable adaptive loop filtering associated with the chroma components of the input picture in response to an intra picture encoding mode being active for the input picture.

Example 12 includes the apparatus of any one of examples 1 to 11, wherein the processor circuitry is to determine whether to enable adaptive loop filtering associated with the chroma components of the input picture based on a location of the input picture in a coding group of pictures and a quantization parameter used to encode the input picture in response to an inter picture encoding mode being active for the input picture.

Example 13 includes the apparatus of any one of examples 1 to 12, wherein the processor circuitry is to determine whether a third collection of available adaptive loop filter sets for cross channel loop filtering associated with the input picture is empty, disable cross channel adaptive loop filtering associated with the input picture in response to the third collection of available adaptive loop filter sets being empty, and in response to the third collection of available adaptive loop filter sets not being empty, determine whether to enable cross channel adaptive loop filtering associated with the input picture based on a location of the input picture in a coding group of pictures and a quantization parameter used to encode the input picture.

Example 14 includes at least one non-transitory computer readable medium comprising computer readable instructions that, when executed, cause one or more processors to at least determine that a collection of available adaptive loop filter sets associated with luma components of an input picture of a video is not empty, and select at least one of the collection of available adaptive loop filter sets to include in a selection of adaptive loop filter sets for the input picture, the selection of adaptive loop filter sets to be signaled to a video decoder that is to perform adaptive loop filtering of luma components of a decoded picture corresponding to the input picture, the selection based on an order in which ones of the available adaptive loop filter sets in the collection were derived.

Example 15 includes the at least one non-transitory computer readable medium of example 14, wherein the instructions are to cause the one or more processors to enable adaptive loop filtering for the luma components of the input picture in response to the collection of available adaptive loop filter sets not being empty.

Example 16 includes the at least one non-transitory computer readable medium of example 14 or example 15, wherein the ones of the available adaptive loop filter sets in the collection were derived for corresponding pictures of the video that preceded the input picture, and the instructions are to cause the one or more processors to limit the selection of adaptive loop filter sets for the input picture to one most recently derived adaptive loop filter set in the collection of available adaptive loop filter sets.

Example 17 includes the at least one non-transitory computer readable medium of any one of examples 14 to 16, wherein the instructions are to cause the one or more processors to select a number of most recently derived adaptive loop filter sets in the collection of available adaptive loop filter sets to include in the selection of adaptive loop filter sets for the input picture, the number to be at least one and less than an upper limit of a size of the collection of available adaptive loop filter sets.

Example 18 includes the at least one non-transitory computer readable medium of any one of examples 14 to 17, wherein the number is a first number and the instructions are to cause the one or more processors to select the first number of the most recently derived adaptive loop filter sets in the collection of available adaptive loop filter sets to include in the selection of adaptive loop filter sets for the input picture in response to a resolution of the input picture being less than a threshold, and select a second number of the most recently derived adaptive loop filter sets in the collection of available adaptive loop filter sets to include in the selection of adaptive loop filter sets for the input picture in response to the resolution of the input picture being greater than the threshold, the second number greater than the first number and less than the upper limit of the size of the collection of available adaptive loop filter sets.

Example 19 includes the at least one non-transitory computer readable medium of any one of examples 14 to 18, wherein the instructions are to cause the one or more processors to reduce the number of the most recently derived adaptive loop filter sets to include in the selection of adaptive loop filter sets for the input picture in response to a quantization parameter used to encode the input picture being greater than a first threshold, and increase the number of the most recently derived adaptive loop filter sets to include in the selection of adaptive loop filter sets for the input picture in response to the quantization parameter used to encode the input picture being less than a second threshold.

Example 20 includes the at least one non-transitory computer readable medium of any one of examples 14 to 19, wherein the second threshold is equal to the first threshold.

Example 21 includes the at least one non-transitory computer readable medium of any one of examples 14 to 20, wherein the second threshold is less than the first threshold.

Example 22 includes the at least one non-transitory computer readable medium of any one of examples 14 to 21, wherein the collection of available adaptive loop filter sets is a first collection, and the instructions are to cause the one or more processors to determine whether a second collection of available adaptive loop filter sets associated with chroma components of the input picture is empty, disable adaptive loop filtering associated with the chroma components of the input picture in response to the second collection of available adaptive loop filter sets being empty, and in response to the second collection of available adaptive loop filter sets not being empty, determine whether to enable adaptive loop filtering associated with the chroma components of the input picture based on an encoding mode for the input picture.

Example 23 includes the at least one non-transitory computer readable medium of any one of examples 14 to 22, wherein the instructions are to cause the one or more processors to enable adaptive loop filtering associated with the chroma components of the input picture in response to an intra picture encoding mode being active for the input picture.

Example 24 includes the at least one non-transitory computer readable medium of any one of examples 14 to 23, wherein the instructions are to cause the one or more processors to enable adaptive loop filtering associated with the chroma components of the input picture based on a location of the input picture in a coding group of pictures and a quantization parameter used to encode the input picture in response to an inter picture encoding mode being active for the input picture.

Example 25 includes the at least one non-transitory computer readable medium of any one of examples 14 to 24, wherein the instructions are to cause the one or more processors to determine whether a third collection of available adaptive loop filter sets for cross channel loop filtering associated with the input picture is empty, disable cross channel adaptive loop filtering associated with the input picture in response to the third collection of available adaptive loop filter sets being empty, and in response to the third collection of available adaptive loop filter sets not being empty, determine whether to enable cross channel adaptive loop filtering associated with the input picture based on a location of the input picture in a coding group of pictures and a quantization parameter used to encode the input picture.

Example 26 includes a method to implement adaptive loop filter selection associated with encoding of an input picture of a video, the method comprising enabling adaptive loop filtering for luma components of the input picture in response to a collection of available adaptive loop filter sets associated with the luma components of the input picture not being empty, selecting, by executing an instruction with at least one processor, at least one of the collection of available adaptive loop filter sets to include in a selection of adaptive loop filter sets for the input picture, the selection based on an order in which ones of the available adaptive loop filter sets in the collection were derived, and signaling the selection of adaptive loop filter sets to a video decoder that is to perform adaptive loop filtering of luma components of a decoded picture corresponding to the input picture.

Example 27 includes the method of example 26, wherein the ones of the available adaptive loop filter sets in the collection were derived for corresponding pictures of the video that preceded the input picture, and the selecting is to limit the selection of adaptive loop filter sets for the input picture to one most recently derived adaptive loop filter set in the collection of available adaptive loop filter sets.

Example 28 includes the method of example 26 or example 27, wherein the selecting is to select a number of most recently derived adaptive loop filter sets in the collection of available adaptive loop filter sets to include in the selection of adaptive loop filter sets for the input picture, the number to be at least one and less than an upper limit of a size of the collection of available adaptive loop filter sets.

Example 29 includes the method of any one of examples 26 to 28, wherein the number is a first number and the selecting includes selecting the first number of the most recently derived adaptive loop filter sets in the collection of available adaptive loop filter sets to include in the selection of adaptive loop filter sets for the input picture in response to a resolution of the input picture being less than a threshold, and selecting a second number of the most recently derived adaptive loop filter sets in the collection of available adaptive loop filter sets to include in the selection of adaptive loop filter sets for the input picture in response to the resolution of the input picture being greater than the threshold, the second number greater than the first number and less than the upper limit of the size of the collection of available adaptive loop filter sets.

Example 30 includes the method of any one of examples 26 to 29, wherein the number is a first number and further including reducing the number of the most recently derived adaptive loop filter sets to include in the selection of adaptive loop filter sets for the input picture in response to a quantization parameter used to encode the input picture being greater than a first threshold, and increasing the number of the most recently derived adaptive loop filter sets to include in the selection of adaptive loop filter sets for the input picture in response to the quantization parameter used to encode the input picture being less than a second threshold.

Example 31 includes the method of any one of examples 26 to 30, wherein the second threshold is equal to the first threshold.

Example 32 includes the method of any one of examples 26 to 31, wherein the second threshold is less than the first threshold.

Example 33 includes the method of any one of examples 26 to 32, wherein the collection of available adaptive loop filter sets is a first collection, and further including determining whether a second collection of available adaptive loop filter sets associated with chroma components of the input picture is empty, disabling adaptive loop filtering associated with the chroma components of the input picture in response to the second collection of available adaptive loop filter sets being empty, and in response to the second collection of available adaptive loop filter sets not being empty, determining whether to enable adaptive loop filtering associated with the chroma components of the input picture based on an encoding mode for the input picture.

Example 34 includes the method of any one of examples 26 to 33, further including enabling adaptive loop filtering associated with the chroma components of the input picture in response to an intra picture encoding mode being active for the input picture.

Example 35 includes the method of any one of examples 26 to 34, further including enabling adaptive loop filtering associated with the chroma components of the input picture based on a location of the input picture in a coding group of pictures and a quantization parameter used to encode the input picture in response to an inter picture encoding mode being active for the input picture.

Example 36 includes the method of any one of examples 26 to 35, further including determining whether a third collection of available adaptive loop filter sets for cross channel loop filtering associated with the input picture is empty, disabling cross channel adaptive loop filtering associated with the input picture in response to the third collection of available adaptive loop filter sets being empty, and in response to the third collection of available adaptive loop filter sets not being empty, determining whether to enable cross channel adaptive loop filtering associated with the input picture based on a location of the input picture in a coding group of pictures and a quantization parameter used to encode the input picture.

Example 37 includes an apparatus to perform block classification for derivation of an adaptive loop filter set associated with an input picture of a video to be encoded, the apparatus comprising at least one memory, machine readable instructions, and processor circuitry to at least one of instantiate or execute the machine readable instructions to classify blocks of the input picture to determine respective class identifiers and class statistics for ones of the blocks, the class identifiers corresponding to a first number of classes, map respective subsets of the first number of classes to corresponding ones of a second number of classes based on one or more characteristics in common between the respective subsets of the first number of classes and the corresponding ones of the second number of classes, the second number less than the first number, and accumulate individual class statistics of the blocks based on the map of the respective subsets of the first number of classes to the corresponding ones of the second number of classes to determine accumulated class statistics for the input picture, the accumulated class statistics corresponding respectively to ones of the second number of classes, the derivation of the adaptive loop filter set to be based on the accumulated class statistics determined for the second number of classes.

Example 38 includes the apparatus of example 37, wherein the one or more characteristics in common between the respective subsets of the first number of classes and the corresponding ones of the second number of classes include at least one of directionality values or spatial activity values.

Example 39 includes the apparatus of example 37 or example 38, wherein respective ones of the first number of classes are associated with respective directionality values and respective spatial activity values, a first subset of the first number of classes includes ones of the first number of classes associated with at least one of a first directionality value or a first spatial activity value, a second subset of the first number of classes includes ones of the first number of classes associated with at least one of a second directionality value different from the first directionality value or a second spatial activity value different from the first spatial activity value, and the processor circuitry is to map the first subset of the first number of classes to a first one of the second number of classes associated with the at least one of the first directionality value or the first spatial activity value, and map the second subset of the first number of classes to a second one of the second number of classes associated with the at least one of the second directionality value or the second spatial activity value.

Example 40 includes the apparatus of any one of examples 37 to 39, wherein to accumulate the class statistics of the blocks, the processor circuitry is to accumulate the individual class statistics of ones of the blocks having class identifiers included in the first subset of the first number of classes to determine a first accumulated class statistic associated with the first one of the second number of classes, and accumulate the individual class statistics of ones of the blocks having class identifiers included in the second subset of the first number of classes to determine a second accumulated class statistic associated with the second one of the second number of classes.

Example 41 includes the apparatus of any one of examples 37 to 40, wherein a number of loop filters included the adaptive loop filter set corresponds to the second number of classes.

Example 42 includes the apparatus of any one of examples 37 to 41, wherein the input picture is a first picture, and the second number of classes also includes one of the first number of classes corresponding to a most frequent class identifier determined for blocks of a second picture that preceded the first picture in the video.

Example 43 includes at least one non-transitory computer readable medium comprising computer readable instructions that, when executed, cause one or more processors to at least classify blocks of an input picture of a video to determine respective class identifiers and class statistics for ones of the blocks, the class identifiers corresponding to a first number of classes, map respective subsets of the first number of classes to corresponding ones of a second number of classes based on one or more characteristics in common between the respective subsets of the first number of classes and the corresponding ones of the second number of classes, the second number less than the first number, accumulate individual class statistics of the blocks based on the map of the respective subsets of the first number of classes to the corresponding ones of the second number of classes to determine accumulated class statistics for the input picture, the accumulated class statistics corresponding respectively to ones of the second number of classes, and derive an adaptive loop filter set for the input picture based on the accumulated class statistics determined for the second number of classes.

Example 44 includes the at least one non-transitory computer readable medium of example 43, wherein the one or more characteristics in common between the respective subsets of the first number of classes and the corresponding ones of the second number of classes include at least one of directionality values or spatial activity values.

Example 45 includes the at least one non-transitory computer readable medium of example 43 or example 44, wherein respective ones of the first number of classes are associated with respective directionality values and respective spatial activity values, a first subset of the first number of classes includes ones of the first number of classes associated with at least one of a first directionality value or a first spatial activity value, a second subset of the first number of classes includes ones of the first number of classes associated with at least one of a second directionality value different from the first directionality value or a second spatial activity value different from the first spatial activity value, and the instructions are to cause the one or more processors to map the first subset of the first number of classes to a first one of the second number of classes associated with the at least one of the first directionality value or the first spatial activity value, and map the second subset of the first number of classes to a second one of the second number of classes associated with the at least one of the second directionality value or the second spatial activity value.

Example 46 includes the at least one non-transitory computer readable medium of any one of examples 43 to 45, wherein the instructions are to cause the one or more processors to accumulate the individual class statistics of ones of the blocks having class identifiers included in the first subset of the first number of classes to determine a first accumulated class statistic associated with the first one of the second number of classes, and accumulate the individual class statistics of ones of the blocks having class identifiers included in the second subset of the first number of classes to determine a second accumulated class statistic associated with the second one of the second number of classes.

Example 47 includes the at least one non-transitory computer readable medium of any one of examples 43 to 46, wherein a number of loop filters included the adaptive loop filter set corresponds to the second number of classes.

Example 48 includes the at least one non-transitory computer readable medium of any one of examples 43 to 47, wherein the input picture is a first picture, and the second number of classes also includes one of the first number of classes corresponding to a most frequent class identifier determined for blocks of a second picture that preceded the first picture in the video.

Example 49 includes a method to perform block classification for derivation of an adaptive loop filter set associated with an input picture of a video, the method comprising classifying blocks of the input picture to determine respective class identifiers and class statistics for ones of the blocks, the class identifiers corresponding to a first number of classes, accumulating, by executing an instruction with at least one processor, individual class statistics of the blocks based on a mapping of respective subsets of the first number of classes to corresponding ones of a second number of classes to determine accumulated class statistics for the input picture, the accumulated class statistics corresponding respectively to ones of the second number of classes, the mapping based on one or more characteristics in common between the respective subsets of the first number of classes and the corresponding ones of the second number of classes, the second number less than the first number, and deriving, by executing an instruction with the at least one processor, the adaptive loop filter set based on the accumulated class statistics determined for the second number of classes.

Example 50 includes the method of example 49, wherein the one or more characteristics in common between the respective subsets of the first number of classes and the corresponding ones of the second number of classes include at least one of directionality values or spatial activity values.

Example 51 includes the method of example 49 or example 50, wherein respective ones of the first number of classes are associated with respective directionality values and respective spatial activity values, a first subset of the first number of classes includes ones of the first number of classes associated with at least one of a first directionality value or a first spatial activity value, a second subset of the first number of classes includes ones of the first number of classes associated with at least one of a second directionality value different from the first directionality value or a second spatial activity value different from the first spatial activity value, and the mapping includes mapping the first subset of the first number of classes to a first one of the second number of classes associated with the at least one of the first directionality value or the first spatial activity value, and mapping the second subset of the first number of classes to a second one of the second number of classes associated with the at least one of the second directionality value or the second spatial activity value.

Example 52 includes the method of any one of examples 49 to 51, wherein the accumulating includes accumulating the individual class statistics of ones of the blocks having class identifiers included in the first subset of the first number of classes to determine a first accumulated class statistic associated with the first one of the second number of classes, and accumulating the individual class statistics of ones of the blocks having class identifiers included in the second subset of the first number of classes to determine a second accumulated class statistic associated with the second one of the second number of classes.

Example 53 includes the method of any one of examples 49 to 52, wherein a number of loop filters included the adaptive loop filter set corresponds to the second number of classes.

Example 54 includes the method of any one of examples 49 to 53, wherein the input picture is a first picture, and the second number of classes also includes one of the first number of classes corresponding to a most frequent class identifier determined for blocks of a second picture that preceded the first picture in the video.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine readable instructions; and
   at least one processor circuit to be programmed based on the machine readable instructions to:
   determine whether a collection of available adaptive loop filter sets associated with luma components of an input picture of a video is empty; and
   based on the collection of available adaptive loop filter sets not being empty:
   enable adaptive loop filtering for the luma components of the input picture;
   select a first number of the adaptive loop filter sets in the collection of available adaptive loop filter sets to include in a selection of adaptive loop filter sets for the input picture based on a resolution of the input picture being less than a threshold; and
   select a second number of the adaptive loop filter sets in the collection of available adaptive loop filter sets to include in the selection of adaptive loop filter sets for the input picture based on the resolution of the input picture being greater than the threshold, the second number greater than the first number, the selection of adaptive loop filter sets to be used to perform adaptive loop filtering of luma components of a decoded picture corresponding to the input picture.

2. The apparatus of claim 1, wherein the available adaptive loop filter sets in the collection were derived for corresponding pictures of the video that preceded the input picture.

3. The apparatus of claim 1, wherein the first number is at least one and the second number is less than an upper limit of a size of the collection of available adaptive loop filter sets.

4. The apparatus of claim 1, wherein the first number of the adaptive loop filter sets includes a first quantity of most recently derived adaptive loop filter sets in the collection of available adaptive loop filter sets, and the second number of the adaptive loop filter sets includes a second quantity of the most recently derived adaptive loop filter sets in the collection of available adaptive loop filter sets.

5. The apparatus of claim 1, wherein one or more of the at least one processor circuit is to:
   reduce a quantity of the adaptive loop filter sets in the selection of adaptive loop filter sets for the input picture based on a quantization parameter used to encode the input picture being greater than a first threshold; and increase the quantity of the adaptive loop filter sets in the selection of adaptive loop filter sets for the input picture based on the quantization parameter used to encode the input picture being less than a second threshold.

6. The apparatus of claim 5, wherein the second threshold is equal to the first threshold.

7. The apparatus of claim 5, wherein the second threshold is less than the first threshold.

8. The apparatus of claim 1, wherein one or more of the at least one processor circuit is to generate the selection of adaptive loop filter sets for the input picture without performing a multiple pass search over the collection of available adaptive loop filter sets.

9. The apparatus of claim 1, wherein one or more of the at least one processor circuit is to disable adaptive loop filtering associated with the luma components of the input picture based on the collection of available adaptive loop filter sets being empty.

10. The apparatus of claim 1, wherein the collection of available adaptive loop filter sets is a first collection, and one or more of the at least one processor circuit is to:

determine whether a second collection of available adaptive loop filter sets associated with chroma components of the input picture is empty;

disable adaptive loop filtering associated with the chroma components of the input picture based on the second collection of available adaptive loop filter sets being empty; and based on the second collection of available adaptive loop filter sets not being empty, determine whether to enable adaptive loop filtering associated with the chroma components of the input picture based on an encoding mode for the input picture.

11. The apparatus of claim 10, wherein one or more of the at least one processor circuit is to enable adaptive loop filtering associated with the chroma components of the input picture based on an intra picture encoding mode being active for the input picture.

12. The apparatus of claim 10, wherein one or more of the at least one processor circuit is to, based on an inter picture encoding mode being active for the input picture, determine whether to enable adaptive loop filtering associated with the chroma components of the input picture based on a location of the input picture in a coding group of pictures and a quantization parameter used to encode the input picture.

13. The apparatus of claim 10, wherein one or more of the at least one processor circuit is to:

determine whether a third collection of available adaptive loop filter sets for cross channel loop filtering associated with the input picture is empty;

disable cross channel adaptive loop filtering associated with the input picture based on the third collection of available adaptive loop filter sets being empty; and based on the third collection of available adaptive loop filter sets not being empty, determine whether to enable cross channel adaptive loop filtering associated with the input picture based on a location of the input picture in a coding group of pictures and a quantization parameter used to encode the input picture.

14. At least one non-transitory computer readable medium comprising computer readable instructions to cause at least one processor circuit to at least:

determine that a collection of available adaptive loop filter sets associated with luma components of an input picture of a video is not empty;

select a first number of the adaptive loop filter sets in the collection of available adaptive loop filter sets to include in a selection of adaptive loop filter sets for the input picture based on a resolution of the input picture being less than a threshold; and select a second number of the adaptive loop filter sets in the collection of available adaptive loop filter sets to include in the selection of adaptive loop filter sets for the input picture based on the resolution of the input picture being greater than the threshold, the second number greater than the first number, the selection of adaptive loop filter sets to be signaled to a video decoder that is to perform adaptive loop filtering of luma components of a decoded picture corresponding to the input picture.

15. The at least one non-transitory computer readable medium of claim 14, wherein the first number is at least one and the second number is less than an upper limit of a size of the collection of available adaptive loop filter sets.

16. The at least one non-transitory computer readable medium of claim 14, wherein the first number of the adaptive loop filter sets includes a first quantity of most recently derived adaptive loop filter sets in the collection of available adaptive loop filter sets to include in the selection of adaptive loop filter sets, and the second number of the adaptive loop filter sets includes a second quantity of the most recently derived adaptive loop filter sets in the collection of available adaptive loop filter sets.

17. The at least one non-transitory computer readable medium of claim 14, wherein the instructions are to cause one or more of the at least one processor circuit to:

reduce a quantity of the adaptive loop filter sets in the selection of adaptive loop filter sets for the input picture based on a quantization parameter used to encode the input picture being greater than a first threshold; and increase the quantity of the adaptive loop filter sets in the selection of adaptive loop filter sets for the input picture based on the quantization parameter used to encode the input picture being less than a second threshold.

18. The at least one non-transitory computer readable medium of claim 14, wherein the collection of available adaptive loop filter sets is a first collection, and the instructions are to cause one or more of the at least one processor circuit to:

determine whether a second collection of available adaptive loop filter sets associated with chroma components of the input picture is empty;

disable adaptive loop filtering associated with the chroma components of the input picture based on the second collection of available adaptive loop filter sets being empty; and based on the second collection of available adaptive loop filter sets not being empty, determine whether to enable adaptive loop filtering associated with the chroma components of the input picture based on an encoding mode for the input picture.

19. The at least one non-transitory computer readable medium of claim 18, wherein the instructions are to cause one or more of the at least one processor circuit to:

determine whether a third collection of available adaptive loop filter sets for cross channel loop filtering associated with the input picture is empty;

disable cross channel adaptive loop filtering associated with the input picture based on the third collection of available adaptive loop filter sets being empty; and based on the third collection of available adaptive loop filter sets not being empty, determine whether to enable cross channel adaptive loop filtering associated with the input picture based on a location of the input picture in a coding group of pictures and a quantization parameter used to encode the input picture.

20. A method comprising:

enabling adaptive loop filtering for luma components of an input picture of a video based on a collection of available adaptive loop filter sets associated with the luma components of the input picture not being empty;

selecting, by executing an instruction with at least one processor circuit, a first number of the collection of available adaptive loop filter sets to include in a selection of adaptive loop filter sets for the input picture based on a resolution of the input picture being less than a threshold;

selecting, by one or more of the at least one processor circuit, a second number of the adaptive loop filter sets in the collection of available adaptive loop filter sets to include in the selection of adaptive loop filter sets for the input picture based on the resolution of the input picture being greater than the threshold, the second number greater than the first number; and signaling the selection of adaptive loop filter sets to a video decoder that is to perform adaptive loop filtering of luma components of a decoded picture corresponding to the input picture.

21. The method of claim 20, wherein the first number is at least one and the second number is less than an upper limit of a size of the collection of available adaptive loop filter sets.

22. The method of claim 20, wherein the first number of the adaptive loop filter sets includes a first quantity of most recently derived adaptive loop filter sets in the collection of available adaptive loop filter sets, and the second number of the adaptive loop filter sets includes a second quantity of the most recently derived adaptive loop filter sets in the collection of available adaptive loop filter sets.

23. The method of claim 20, including:

reducing a quantity of the adaptive loop filter sets in the selection of adaptive loop filter sets for the input picture based on a quantization parameter used to encode the input picture being greater than a first threshold; and increasing the quantity of the adaptive loop filter sets in the selection of adaptive loop filter sets for the input picture based on the quantization parameter used to encode the input picture being less than a second threshold.

24. The method of claim 20, wherein the collection of available adaptive loop filter sets is a first collection, and including:

determining whether a second collection of available adaptive loop filter sets associated with chroma components of the input picture is empty;

disabling adaptive loop filtering associated with the chroma components of the input picture based on the second collection of available adaptive loop filter sets being empty; and based on the second collection of available adaptive loop filter sets not being empty, determining whether to enable adaptive loop filtering associated with the chroma components of the input picture based on an encoding mode for the input picture.

25. The method of claim 24, including:

determining whether a third collection of available adaptive loop filter sets for cross channel loop filtering associated with the input picture is empty;

disabling cross channel adaptive loop filtering associated with the input picture based on the third collection of available adaptive loop filter sets being empty; and based on the third collection of available adaptive loop filter sets not being empty, determining whether to enable cross channel adaptive loop filtering associated with the input picture based on a location of the input picture in a coding group of pictures and a quantization parameter used to encode the input picture.

*    *    *    *    *